(12) United States Patent
Taub

(10) Patent No.: US 6,341,267 B1
(45) Date of Patent: *Jan. 22, 2002

(54) METHODS, SYSTEMS AND APPARATUSES FOR MATCHING INDIVIDUALS WITH BEHAVIORAL REQUIREMENTS AND FOR MANAGING PROVIDERS OF SERVICES TO EVALUATE OR INCREASE INDIVIDUALS' BEHAVIORAL CAPABILITIES

(75) Inventor: Herman P. Taub, Westport, CT (US)

(73) Assignee: Enhancement of Human Potential, Inc., Fairfield, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,968

(22) Filed: Jul. 2, 1997

(51) Int. Cl.[7] ............................................. G06F 17/60
(52) U.S. Cl. ........................... 705/11; 700/108; 434/238
(58) Field of Search ........................ 705/1, 11, 7, 8–10; 434/258, 236, 237, 238, 322; 700/99–101, 108

(56) References Cited

U.S. PATENT DOCUMENTS

| 356,695 A | 1/1887 | Reid et al. |
| 2,750,683 A | 6/1956 | Theobald ........................ 35/22 |
| 2,945,306 A | 7/1960 | Flanagan ........................ 35/22 |

(List continued on next page.)

FOREIGN PATENT DOCUMENTS

| JP | 403230660 | * 10/1991 | |
| JP | 403289746 | * 10/1991 | |
| JP | 408202257 | * 8/1996 | |
| WO | WO 85/00098 | 1/1985 | ............ A61B/5/00 |
| WO | WO 9402222 | * 2/1994 | |

OTHER PUBLICATIONS

Watkins, Jr. et al. Testing in Counseling Practice New Jersey: Lawrence Erlbaum Associates, 1990.*

(List continued on next page.)

Primary Examiner—Eric W. Stamber
Assistant Examiner—Hani M. Kazimi
(74) Attorney, Agent, or Firm—George T. Marcou; Kilpatrick Stockton LLP

(57) ABSTRACT

The invention comprises of a structural algorithm, processes, apparatuses and systems for evaluating, matching and fostering individuals' behavioral capabilities to the requirements for successful human performance in any role and situation. The invention uses a new algorithm to construct a profile of required ability levels underlying the performance of recognized successful individuals in specific situations. Other individuals are then evaluated only in terms of discrepancies between required ability levels and the levels indicated by their performance of indicators of attainment in each of the required dimensions of ability. Required abilities are selected for each comparison in seven linked types of behavior, each with its own method of measurement. As the measurement methods of the invention are used only to construct comparison gauges of a specific requirement and an individual attainment, there is no need for inferring absolute value or generalizable meaning to any ability measurement. The invention employs a novel algorithm and method to construct multidimensional gauges of the necessary and sufficient behavioral abilities, novel processes to identify individual's attained levels of the required abilities and to match individual's abilities with role-situation requirements, novel processes to evaluate or select intervention strategies for furthering individual's attainment of required abilities and a novel algorithm to identify the level of stress induced by computer presentations. Applications of the invention are anticipated in human resource management, training, education, counseling, therapy, medical, self-help and other settings.

24 Claims, 22 Drawing Sheets

U.S. PATENT DOCUMENTS

| | | | |
|---|---|---|---|
| 3,003,255 A | 10/1961 | Katz | 35/22 |
| 3,357,115 A | 12/1967 | Kelley | 35/22 |
| 3,426,450 A | 2/1969 | Isenhour | 35/22 |
| 3,438,414 A | 4/1969 | Kirksey | 35/22 |
| 3,545,749 A | 12/1970 | Schmued | 273/1 |
| 3,579,865 A | 5/1971 | Walker | 35/22 |
| 3,581,408 A | 6/1971 | Mohier | 35/22 |
| 3,717,347 A | 2/1973 | Hottendorf | 273/95 R |
| 3,837,095 A | 9/1974 | O'Hara | 35/22 R |
| 3,869,812 A | 3/1975 | Arakelian et al. | 35/22 R |
| 3,872,443 A | 3/1975 | Ott | 340/172.5 |
| 3,952,422 A | 4/1976 | Roberts, Jr. | 35/22 R |
| 3,971,143 A | 7/1976 | Slomski | 35/22 R |
| 3,999,307 A | 12/1976 | Tsuda et al. | 35/9 A |
| 4,014,108 A * | 3/1977 | Hester | 434/401 |
| 4,028,819 A | 6/1977 | Walker | 35/22 R |
| 4,058,113 A | 11/1977 | Fields | 128/2 N |
| 4,086,710 A | 5/1978 | Craine | 35/22 R |
| 4,114,291 A | 9/1978 | Taub | 35/36 |
| 4,325,697 A | 4/1982 | Regan et al. | 434/258 |
| 4,360,345 A | 11/1982 | Hon | 23/28 |
| 4,422,105 A | 12/1983 | Rodesch et al. | 358/903 |
| 4,464,121 A | 8/1984 | Perelli | 434/236 |
| 4,541,806 A * | 9/1985 | Zimmerman et al. | 434/258 |
| 4,627,818 A | 12/1986 | Von Fellenberg | 434/236 |
| 4,671,772 A | 6/1987 | Slade et al. | 434/219 |
| 4,755,140 A | 7/1988 | Rimland | 434/236 |
| 4,770,636 A | 9/1988 | Buschke | 434/236 |
| 4,885,687 A | 12/1989 | Carey | 364/413.02 |
| 4,890,495 A | 1/1990 | Slane | 73/379 |
| 4,895,518 A | 1/1990 | Arnold et al. | 434/118 |
| 4,931,934 A | 6/1990 | Snyder | 364/419 |
| 4,931,950 A | 6/1990 | Isle et al. | 364/513 |
| 4,983,125 A | 1/1991 | Smith et al. | 434/258 |
| 5,059,127 A * | 10/1991 | Lewis et al. | 434/353 |
| 5,078,152 A | 1/1992 | Bond et al. | 128/774 |
| 5,079,726 A | 1/1992 | Keller | 364/551.01 |
| 5,082,446 A | 1/1992 | Sclan et al. | 434/236 |
| 5,117,353 A * | 5/1992 | Stipanovich et al. | 705/11 |
| 5,135,399 A | 8/1992 | Ryan | 434/236 |
| 5,164,912 A | 11/1992 | Osborne et al. | 364/580 |
| 5,167,229 A | 12/1992 | Peckham et al. | 128/421 |
| 5,178,160 A | 1/1993 | Gracovetsky et al. | 128/782 |
| 5,184,295 A | 2/1993 | Mann | 364/410 |
| 5,190,458 A * | 3/1993 | Driesener | 434/236 |
| 5,211,562 A | 5/1993 | Wickstrom | 434/260 |
| 5,230,629 A | 7/1993 | Buschke | 434/236 |
| 5,278,829 A | 1/1994 | Dunlap | 370/94.1 |
| 5,289,389 A | 2/1994 | Keller | 364/551.01 |
| 5,293,772 A | 3/1994 | Carr, Jr. | 73/64.41 |
| 5,297,558 A | 3/1994 | Acorn et al. | 128/719 |
| 5,298,964 A | 3/1994 | Nelson et al. | 356/33 |
| 5,318,597 A | 6/1994 | Hauck et al. | 607/20 |
| 5,319,633 A | 6/1994 | Geyer et al. | 370/17 |
| 5,323,309 A | 6/1994 | Taylor et al. | 364/184 |
| 5,326,270 A * | 7/1994 | Ostby et al. | 434/362 |
| 5,335,188 A | 8/1994 | Brisson | 364/551.01 |
| 5,335,299 A | 8/1994 | Atkinson | 382/56 |
| 5,344,324 A | 9/1994 | O'Donnell et al. | 434/258 |
| 5,358,519 A | 10/1994 | Grandjean | 623/3 |
| 5,365,425 A | 11/1994 | Torma et al. | 364/401 |
| 5,403,190 A * | 4/1995 | Wickstrom | 434/260 |
| 5,406,278 A | 4/1995 | Graybill et al. | 341/51 |
| 5,419,197 A | 5/1995 | Ogi et al. | 73/659 |
| 5,435,324 A * | 7/1995 | Brill | 128/897 |
| 5,657,256 A * | 8/1997 | Swanson et al. | 702/119 |
| 5,841,655 A * | 11/1998 | Stocking et al. | 364/188 |
| 5,879,165 A * | 3/1999 | Brunkow et al. | 434/322 |

OTHER PUBLICATIONS

Krug, Samuel E. Psychware: A Reference Guide to Computer–Based Products for Behavioral Assessment in Psychology, Education, and Business Kansas City: Test Corporation of America, 1984.*

Muchinsky, Paul M. Psychology Applied to Work 4th Ed. Pacific Grove, California: Brooks/Cole Publishing Company, 1993.*

Gregory, Robert J. Psychology Testing History, Principles, and Applications Boston: Allyn and Bacon, 1992.*

* cited by examiner

| Ability types | Description - common descriptors: | Examples of specific ability elements of each type (Lx = some specific level of): | Underlying ability types: |
|---|---|---|---|
| I. | COGNITIVE, consisting of a level of thinking process and level of knowledge in a specific field. | Lx problem solving of Lx algebra; Lx reading of Lx English; Lx remembering of Lx the name of _____; Lx knowing of Lx the chemistry of _____; Lx understanding of Lx the philosophy of _____; Lx creativity in designing Lx _____. | none |
| II. | AFFECTIVE, consisting of a level of feeling or attitude associated with some specific. | *Depending on role-situation, requirement can be for a minimum and/or maximum* Lx feeling confident in _____; Lx empathizing with the feeling of other _____; Lx persisting in _____; Not greater than Lx empathizing with the plight of debtors. | I. |
| III. | PHYSIOLOGICAL, consisting of a psychomotor process resulting in a level of biophysical performance. | Lx finger dexterity (e.g., for keying a musical instrument); Lx boredom tolerance (in situations with a low rate-of-change in stimulus inputs); Lx speech (e.g., for enunciation of language); Lx muscle strength (e.g., for weight lifting). | I & II |
| IV. | STRATEGIC, c/o of level range and complexity level of appropriate strategies in ambiguous situations. | *Depending on role-situation, requirement can be for a minimum and/or maximum:* I, II, & Lx communicating complexity (e.g., of own vision) to Lx diverse others (with a wide III range of interests/understanding; (also in appraising, analyzing, planning and monitoring). | I, II, & III |
| V. | AESTHETIC, c/o sensitivity to a level of the qualities of beauty in a particular mode of sensory input | Appreciating Lx beauty in _____ (e.g., music, speech, body movement, personal appearance, sculpture, relationships) | I, II, III, & IV |
| VI. | ETHICAL, c/o level of consistency in applying a level of appropriate, specific type if concern for others. | *Depending on role-situation, requirement can be for a minimum and/or maximum:* I, II, III, Lx consistency in fulfilling Lx communal responsibilities; Lx consistency in expressing IV & V Lx respect for others (e.g., in resisting opportunities for improper personal gain). | I, II, III, IV & V |
| VII. | SPIRITUAL, c/o a level of appropriate subservience of own interests to metaphysical ideal. | Lx humility (e.g., in appreciating enormity of inheritance); Lx commitment (e.g., to seek understanding and connection with an ultimate vision). | I, II, III, IV V & VI |

FIG. 4A

| HIGHER TYPE ABILITY ELEMENT | UNDERLYING TYPES of ABILITY ELEMENTS (examples) |
|---|---|
| I. COGNITIVE | No underlying behavioral abilities; only neural and biochemical underlays |
| II. AFFECTIVE | I. Thinking skill and Knowledge (e.g., for empathy, understanding body language) |
| III. PHYSIOLOGICAL | II. Feeling or Attitude (e.g., for *muscle strengths*; persistence in exercising), plus<br>I. Thinking skill and knowledge (e.g., understanding principles of attaining physiological objective) |
| IV. APPLIED STRATEGIES | III. Biophysical performance (e.g., sensory sensitivities, stress management), plus<br>II. Attitude or Feeling (e.g., empathy, willingness, not fearing), plus<br>I. Thinking skill and Knowledge (e.g., essential facts). |
| V. AESTHETIC | IV. Executive skill, i.e., range and complexity of strategies (e.g., in processing conflict/ambiguity), plus<br>III. Biophysical performance (e.g., in sensory observations, in experiencing enjoyment), plus<br>II. Attitude or Feeling (e.g., concentration, sensitivity to feelings), plus<br>I. Thinking skill and Knowledge (e.g., of form/technique). |
| VI. ETHICAL | V. Sensitivity to beauty (e.g., in sensing and appreciating harmony), plus<br>IV. Executive skill (e.g., in addressing conflicting demands, acting in ambiguous situations) plus,<br>III. Biophysical performance (e.g., applying physical resources for heroics, stress management), plus<br>II. Attitude or Feeling (e.g., sensitivity to feelings, valuing consequences, charitable values), plus<br>I. Thinking skill and Knowledge (e.g., of effective actions, obtaining resources). |
| VII. SPIRITUAL | VI. Trust building, i.e., consistency on concern for others (e.g., in a worshipful community), plus<br>V. Sensitivity to beauty (e.g., in appreciating metaphysical creativity), plus<br>IV. Executive skill (e.g., in committing amidst ambiguity, in resolving worldly conflicts), plus<br>III. Biophysical performance (e.g., in experiencing joy, stress management, overall health), plus<br>II. Attitudes or Feeling (e.g., humility, self confidence, values), plus<br>I. Thinking skill and Knowledge (e.g., in understanding limits of science, in exercising creativity). |

FIG. 4B

651- Role-Situation Requirement Storage (see Fig. 2a block 205)
   1. includes historical record of data on tasks, techniques, abilities, conditions and rewards 652- Individual Attainment Storage (see Fig. 2b block 214)
   1. includes historical record of raw data from all abilities measurement processed 653- Ability Scale Storage (see Fig. 2c block 223)

654- Optimum Match Storage (see Fig. 2e block 236)
   1. includes historical record of data and tabulations from role-situation matches 655- Intervention Data Storage (see Fig. 2g block 254)
   1. historical record of data and tabulations from intervention evaluations and matches 656- Ability Measures Library (see Fig. 2c block 215)

657- User (client and/or staff) program library (software rendering of invention description)
   1. includes operating programs for all system usage 658- Statistical procedures library (for processes of Fig. 2c block 218 & Fig. 2f locks 240, 241)
   1. includes validity check protocols (see Fig. 2f) and historical data 659- User identification and usage record (for use with item 657)
   1. includes secure identification protocols and historical data 660- System security protocols and data records (for use with Fig. 6a block 610)

661- Financial programs and records (as commercially available and in accordance with generally accepted accounting practice)

NOTE: All of the above databases and libraries maintain a record of updates and changes. Access to any or all databases may be obtained through remote or central station workstations (see Fig. 6a) for use by clients and by system administrative, maintenance and technical-assistance staff with appropriate security status.

FIG. 6B

Ⓐ Alternative location for a transducer to measure skin resistance

Ⓑ Alternative location for a broadband or tuned transducer to pick-up brain waves

METHODS, SYSTEMS AND APPARATUSES FOR MATCHING INDIVIDUALS WITH BEHAVIORAL REQUIREMENTS AND FOR MANAGING PROVIDERS OF SERVICES TO EVALUATE OR INCREASE INDIVIDUALS' BEHAVIORAL CAPABILITIES

BACKGROUND OF THE INVENTION

There is a tremendous need for more reliable, comprehensive and generalizable measures of individual's behavioral capabilities and better techniques for their attainment. Means to measure the status and changes in status of behavioral capabilities are required to evaluate the effects of the hundreds of billions of dollars spent every year for education, training, therapy and medical services in the United States alone. Employers in business, government and other kind organizations evaluate staff and new hire capabilities attempting to increase successes and avoid failures. Individuals pursuing a desired lifestyle inevitably confront the need to assure being capable to undertake vocational, social and community responsibilities. The rise and fall of businesses, nation powers and of entire civilizations has been consistently attributed to changes in the relative match between required and available capabilities. In these times, human capabilities, rather than ownership of land or military might, is projected to be the basis of future power and wealth.

Available measures of behavioral capabilities inadequately meet this need. They are unreliable, depending on uncontrolled subjective judgements. They are irrelevant to the capabilities actually required, using test scores based on different skills. They are not comprehensive, only addressing some of the types of required capabilities and, therefore of very limited potential validity as predictors of success. They are misleading and destructive, indicating an individual's deviation from normative behavior rather than the status of an individual's capability attainment. They are often useless, not providing information on individual's status on the path to a needed capability. And, for all of these reasons, decisions based on available measures effecting opportunity denials to individuals are often unfair and unjust.

It is common in the prior art to evaluate and enhance behavioral capabilities through measurement methods, systems and apparatuses. U.S. Pat. No. 5,365,425 issued to Torma discloses a method and system for measuring management effectiveness. U.S. Pat. No. 5,344,324 issued to O'Donnell discloses a method and apparatus for testing capability to perform tasks requiring switching of skills. U.S. Pat. No. 5,135,399 issued to Ryan describes a method for evaluating and teaching motivation skills. U.S. Pat. No. 5,082,416 issued to Sclan discloses a process for the adaptation of cognitive and psychological tests for use in the assessment of dementia patients. U.S. Pat. No. 4,770,636 issued to Buschke discloses instrumentation for measuring memory and concentration. U.S. Pat. No. 4,755,140 issued to Rimland discloses a hand held apparatus and method to measure reaction time and awareness. U.S. Pat. No. 4,627,818 issued to Von Fellenberg discloses a self-assessment method and apparatus for measuring relative disposition towards particular tasks. It is apparent from even this brief summary of prior art and confirmed by more extensive search by the inventor that available measures of behavioral capabilities address disparate dimensions and that there is no existing overall typology of capabilities to operationally define the boundaries of a specific behavioral capability dimension or the necessary and sufficient set of capability requirements for a particular role.

It is also common in the prior art to use algorithms to match sets of data involving non-standardized dimensions. U.S. Pat. No. 5,406,278 issued to Graybill uses an algorithm to match sets of data for compression. An algorithm is a specific numerical process comprising a series of operations for arriving at a useful outcome. U.S. Pat. No. 5,335,299 issued to Atkinson discloses an algorithm to compare common and uncommon bits of video data for compression. U.S. Pat. No. 5,323,309 issued to Taylor discloses an algorithm for comparing motion data to switch data sampling rates. U.S. Pat. No. 5,319,633 issued to Geyer discloses an algorithm and device for generating a topology map. U.S. Pat. No. 5,297,558 issued to Acorn discloses an algorithm for prescribing an optimum exercise regimen. U.S. Pat. No. 5,278,829 issued to Dunlap discloses an algorithm for comparing current and previous addresses of network targets. There is no known prior art, however, using an algorithm for comparing data for the evaluation of behavioral capabilities.

Current means for the evaluation and control of individuals' attainment of behavioral capabilities depend on subjective judgements and psychological testing. Subjective judgements are inherently unreliable and depend on the skills of the person exercising the judgement and his or her understanding of the individual being evaluated and of specific role requirements, all capabilities, in themselves, requiring more reliable, comprehensive and generalizable measures and better techniques for attainment. Psychological testing largely depends on comparing an individual's score with norms of scores on the identical test obtained from some reference sample of individuals, inherently involving the issue of the relevancy of the test score to the capabilities required for a specific role and situation. Also, current techniques employed in psychological testing do not address all the types of behavioral capabilities required in most roles and, therefore, are of very limited potential validity for predicting success or failure in most roles.

There are no known generalizable means, for example, for measuring the enabling aesthetic capabilities that are required in every person for their own artful living and for many vocational responsibilities. Effective personal, family, organizational and national policies increasingly involve complex trade-offs requiring strategic capabilities for which there are no existing generalizable measurement means. Families, communities and nations are struggling with the destructive effects of inadequate means to evaluate and foster attainment of the ethical and moral capabilities that enable individuals to enter and maintain trusting relationships. And, ultimately, the success of nations and civilizations depend on individual abilities to adopt and contribute to values based on presently unmeasured spiritual attainments.

Existing tests of individual capabilities have been developed around the limited needs and resources of particular users. Intelligence tests were originally developed to identify individuals with below normal mental abilities for admittance to mental institutions. Subsequently, the use of intelligence tests were expanded to identify individuals with minimum or superior mental abilities required for success in schools, military service and jobs. As the single score on intelligence tests was found to mask the status of individuals' abilities important to users, multiple aptitude tests were developed to identify individuals' readiness, achievement tests were developed to measure the effects of education and training programs, and personality tests were developed to identify individuals with propensities for desirable and undesirable behaviors. With all these tests, individuals scoring below norms are unfairly labeled as abnormal or as having special needs whereas, in reality, it is the measurement method which is inadequate. The inadvertent labeling of individuals as inadequate, however, effectively discourages individuals from pursuing success at situations using such testing to screen individuals.

Whereas specific individuals and institutions often achieve desired success without explicit measures of behavioral capabilities, those unable to so succeed are more dependent on valid measures for analysis of the lack in required capabilities and for the effective management of their attainment. Without the effective means to attain capabilities for desired, socially acceptable successes, individuals tend to undertake developing the more attainable capabilities for succeeding in socially unacceptable undertakings.

OBJECTIVES OF THE INVENTION

In addition to addressing all the aforementioned inadequacies in available measures of behavioral capabilities—unreliability, irrelevancy, uncomprehensiveness, useless misleading and damaging information, contributing to unjust and unfair decisions—the object of this invention is the following:

1. to define and measure the capability requirements for all roles and positions and in all situations, including for any role in any family or community; for students or teachers in any school; for patients or service providers in any health service setting; and for any job or any responsibility in any organization.
2. to measure the status of any individual's current capabilities regardless of age, sex, disability or previous experiences.
3. to measure the change in individuals' capabilities effected by particular experiences (identifiable as a combination of specific interactions, service-providers, services, institutions, costs, times and time periods, including educational and medical settings).
4. to facilitate the use of behavioral measures and the more effective attainment of desired capabilities at earlier ages and by all individuals, families, organizations and, in particular, in managed living, education, work and health care settings.
5. to significantly increase accuracy in predicting the appropriateness of individual's capabilities to perform successfully in any specific role and situation (by more encompassing, sensitive and discriminating matching of individual's capabilities attainment status with capabilities requirements).
6. to select the optimum additional experiences to effect a specific change in an individual's capabilities. (The bases of selection of an experience as optimum may be varied, e.g., between duration, setting, location and cost of experiences, or any other combination of factors.)
7. to identify alternate abilities in achieving success (i.e., alternative ability requirements for the same role and position) and alternative paths to their attainment, thus not wastefully or not unfairly evaluating individuals with unusual ability requirements.
8. to provide individuals with paths of training and in-role experiences with just-right-challenges (neither too boring or too overwhelmingly difficult).
9. to evaluate the capabilities of providers of services targeted to increase individual's capabilities and to more effectively and accurately match them with the needs students-trainees-patients. (A synergistic benefit is anticipated from applying the processes, systems and apparatuses of this invention to both service providers and recipients of services. The skills honed by providers using the invention in developing their own capabilities, not only result in more skilled services for clients but also provide opportunities for developing improved service provider skills to use the invention with their clients.)
10. to select a role and situation which matches the present or projected capabilities of an individual, including determining or projecting when a student, present staff person or patient will possess the required abilities to undertake or return to a role/situation. (Although it may not be feasible for some individuals to undertake developing the capabilities required for some roles or situations and it is not possible for any individual to develop all required capabilities, with this invention it is feasible for every individual to attain the capabilities required for some roles and situations at any time and for some more demanding roles at some future times.)
11. to efficiently manage the availability of human resources, facilitating the transfer of individuals with particular capabilities surplus in one place and time to other places where the demand for such, or further developed, human resources is greater than the current local supply.
12. to identify discrepancies between estimated capability requirements and actual capability requirements and to automatically implement adjustments indicated thereby to improve the accuracy of applications 1 and 4 above (commonly described as an expert system function).
13. to carry-out ongoing and longitudinal analyses of the data on individuals using the invention so as to identify improvements in the accuracy of indicators defining scales of behavioral capabilities and to automatically implement adjustments indicated thereby to improve the performance of this invention in all applications (commonly described as an expert system function).
14. to establish a database of competency requirements and intervention strategies which, through the expert system functions of this invention, will result in the identification and dissemination of information enabling more people achieving more success in all roles and situations worldwide.
15. to facilitate the further attainment and maintenance of human capabilities, power and true wealth by all individuals, organizations and local and national governments.
16. to facilitate greater, more effective and more efficient development of essential abilities, especially those minimally previously addressed because of inadequacies in available methodologies, resulting in more effective organizations, more cost-effective education, training and health care and, consequently, individuals' greater attainment of personal goals and overall humanness.
17. to reduce individuals' tendencies to undertake behaviors and roles undesired by the aesthetic-ethical-moral-spiritual norms of societies by increasing individuals' access to, and success in, roles valued in such societies.

SUMMARY OF THE INVENTION

These objectives are accomplished with an improved process, system and apparatus, all including or related to an algorithm utilizing seven types of behavioral abilities to compare an individual's attained abilities with all the abilities required for any role in any situation. It has been discovered according to the present invention a process for evaluating an individual's behavioral capabilities as the profile of differences between required and attained capabilities respectively measured on the same scales and thus canceling out inadequacies in their separate measurement and avoiding misuse of their separate interpretations. It has also been discovered according to the present invention a process for redefining role performance requirements from disparate capability statements to a set of related abilities in a typology of behavioral requirements generalizable to all roles in all situations. It has also been discovered in the present invention an algorithm for constructing a multidimensional structure of related different types of ability elements, each type distinguished by its method of measurement and its relationship with the other types. It has also been discovered according to the present invention a process for identifying individual's behavioral capabilities as a display of the profile of the differences between attained and required abilities. It has also been discovered according to the present invention a process for evaluating interventions targeted at increasing individuals' abilities involving evaluation of the affects of pre-intervention abilities and other pre-intervention conditions. It also has been discovered according to the present invention a system for matching individuals with the behavioral requirements of particular roles in situations. It has also been discovered according to the present invention an apparatus for unobtrusively obtaining data on an individual's brain waves associated with specific computer operations thus minimizing the effects of the data collection process on the operator's brain waves. It has also been discovered according to the present invention an apparatus for unobtrusively obtaining data on an individual's tension levels associated with specific computer operations thus minimizing the effects of the data collection process on the operator's tension. It has also been discovered according to the present invention an algorithm to identify the relative tension inducing effects on computer operators of particular computer presentations.

Further novel features and other objects of the present invention will become apparent from the following description of the preferred embodiment and the appended claims, taken in conjunction with the drawings.

BRIEF DESCRIPTION OF THE DRAWINGS

FIGS. 2(a through g) and 3(a through e) are flow charts of the preferred embodiment of the processes of the invention.

FIG. 3a is a flow chart of the process of the invention for defining levels of required Type VII spiritual abilities as a subprocess to the process of FIG. 2a.

FIG. 3b is a flow chart of the process of the invention for defining levels of required Type VI ethical abilities as a subprocess to the process of FIG. 2a.

FIG. 3c is a flow chart of the process of the invention for defining levels of required Type V aesthetic abilities as a subprocess to the process of FIG. 2a.

FIG. 3d is a flow chart of the process of the invention for defining levels of required Type IV strategic abilities as a subprocess to the process of FIG. 2a.

FIG. 3e is a flow chart of the process of the invention for defining levels of required Type III physiological abilities as a subprocess to the process of FIG. 2a.

FIG. 3f is a flow chart of the process of the invention for defining levels of required Type II affective abilities as a subprocess to the process of FIG. 2a.

FIG. 3g is a flow chart of the process of the invention for defining levels of required Type I cognitive abilities as a subprocess to the process of FIG. 2a.

FIG. 4a is a chart providing an overall description of the seven types of ability elements in the algorithm for constructing a multidimensional structure as a gauge for matching individual's capabilities with behavioral requirements.

FIG. 4b is a chart of the types of ability elements underlying higher type ability elements in the algorithm for constructing a multidimensional structure as a gauge for matching individual's capabilities with behavioral requirements.

FIG. 6b is a list of the databases and libraries in central station memory in a system for matching individuals with the behavioral requirements of particular roles in situations.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the present invention.

In the following description all references to role and situation are intended to include all undertakings of an individual including at work and play, in a family and community, as service recipient and provider, as student and teacher, as patient and physician-therapist and as a participant in any and all other social activities in and all specific settings including particular workplaces, homes, churches, schools and medical facilities.

Figure 1:
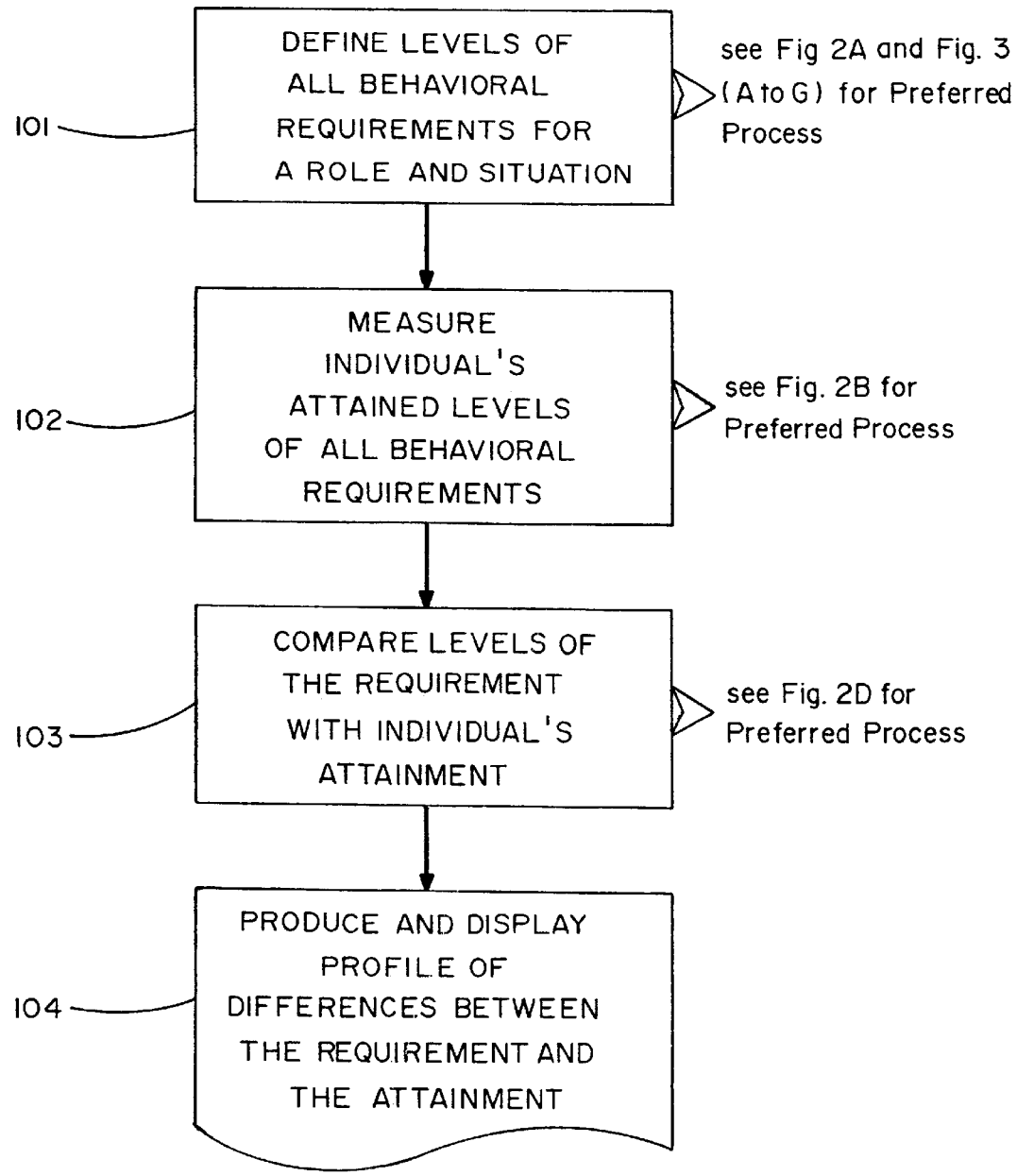
FIG. 1 is a flow chart of the basic process of the invention for identifying individual capabilities as differences to the behavioral requirements for a particular role and situation.

Referring to FIG. 1 there is shown the flow chart of the present invention having an improved process for evaluating an individual's behavioral capabilities as the profile of differences between required and attained capability levels respectively measured on the same scales and thus canceling out inadequacies in their separate measurement and avoiding misuse of their separate interpretation. The first step in the basic process (block 101 at FIG. 1) is defining capability requirements for a particular role and situation as levels of dimensions of capabilities, followed by a second step (block 102) of identifying the individual's levels of capability attainments in the same dimensions used to define requirements in the first step. The third step (block 103) in this basic process is the comparison of requirements defined in step 1 with the individual attainments defined in step 2 utilizing any commonly used technique of comparison, most simply subtracting the respective required levels from the individual's attained levels. The comparison here carried out will be more effective than usual because it will involve comparing requirements and availabilities on the same dimensions and scales instead of the proverbial meaningless comparisons of apples and oranges. The fourth and final step in this basic process (block 104) involves producing and displaying a profile of the differences between required levels and the individual's attained levels in the various capability dimensions, most simply as a chart of positive and negative values. The basic process of FIG. 1 is described in a more detailed and preferred embodiment in FIGS. 2a through 2h and 3a through 3g.

Although an important advantage of this invention is that it is applicable to all roles in all situations, it is also anticipated that not every role and every situation require all the types of behavioral capabilities and that only some types of behavioral capabilities may be required in some roles. a key element of this invention is in defining behavioral capabilities in terms of scalable dimensions with invariant parameters, that is in defining behavioral requirements and identifying attainments using dimensions on which a specific level can be relied upon to infer encompassing of behavioral capabilities of all lower levels of the dimension and to infer not inclusive of behavioral capabilities at all higher levels of the dimension thus increasing the efficiency of defining requirements in that only the highest level requirement needs to be specified. The use of such scales also increases the usefulness of the identification of an individual's attainment in that it indicates a path for the individual to attain higher levels, marked by the higher level capability indicators, and a measure of the further distance that must be attained along each path. Another important feature of this invention is that it extends the application of behavioral scales with invariant parameters to all types of capabilities, thus increasing the probability of an individual succeeding in the role and situation with which he or she is matched by being sensitive to additional types of behavioral requirements such as the ability to devise and implement strategies in situations with missing and ambiguous information and the ability to work in a situation specific culture. It is anticipated, however, that in some situations a lower level of some types of capabilities may be preferred to a higher level, for example, in situations where the role requires an incumbent to be satisfied to carry out responsibilities exactly as directed without any tendencies to try out seemingly better procedures.

Another advantage of the procedure depicted in FIG. 1 is that it starts with defining the requirements for a particular role and particular situation. Identical roles in different situations may require very different capabilities depending on their respective procedures, techniques and cultures. It is anticipated, however, that this invention may be advantageously but less effectively applied to groupings of similar roles and similar situations as many, if not all, of the abilities required for a role in one situation may be identical for the same role in other situations. It should be noted that the methods of this invention describe paths for every individual attaining useful levels of an unlimited number of capabilities although, of course, no individual has the prerequisite requirements and resources to attain all required capabilities.

Figure 2A:
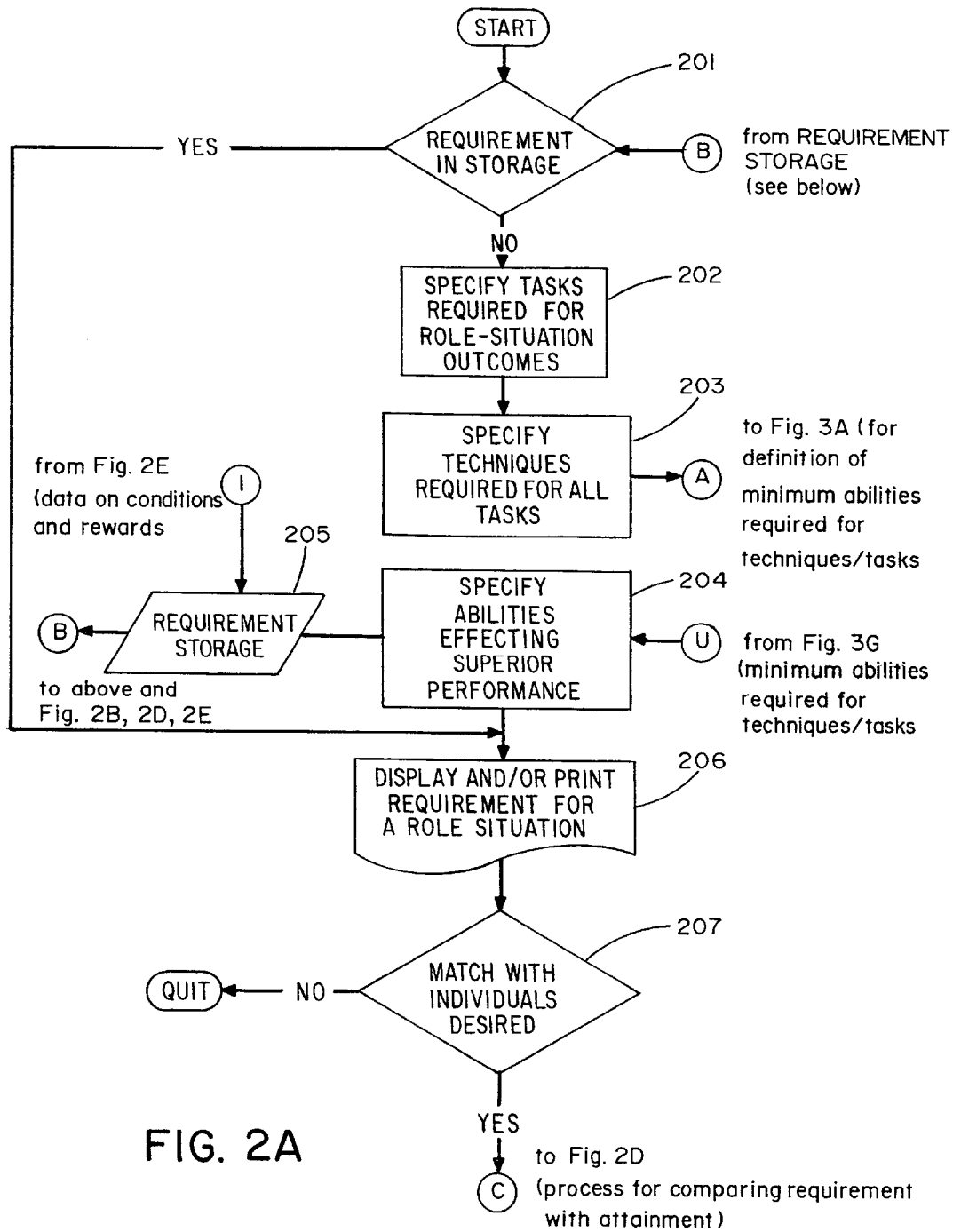
FIG. 2a is a flow chart of the overall process of the invention for defining capability requirements for a particular role and situation.

Referring to FIG. 2a, there is a flow chart further illustrating the process of block 101 in FIG. 1, expanded to utilize the present invention algorithm for specifying capability requirements for any role and situation in terms of underlying abilities, rather than the disparate bases commonly used, and expanded to also function as part of the present invention system. The first step in the process of FIG. 2a (block 201) is checking whether or not the defined behavioral requirement for the particular role and situation is already in storage (block 205) in a data file. If so, the process moves to block 206. If the behavioral requirement for the particular role and situation is not in storage, the next step (block 202) is to define all the tasks required to carry out the responsibilities of the role, i.e., to achieve desired outcomes. Tasks are definitions of the necessary and sufficient set of outcomes defining success in a particular role and situation. After defining tasks, the next step (block 203) is to define all the techniques required to accomplish the tasks. Techniques are specific series of behaviors found or prescribed as particularly effective in accomplishing outcomes, i.e., tasks. After defining techniques, the next steps involve defining the minimum levels and types of abilities required in carrying out role responsibilities and defined tasks and techniques. All the capability evaluation, matching and intervention management methods of this invention are based on measurements of underlying abilities. The advantage of translating all role, task and technique responsibilities to underlying abilities, as in the methods of this invention, is that the algorithm and abilities typology of this invention provide universal scalable elements with which to gauge comparisons of role requirements with individual's attainment.

Referring to FIG. 4a, there is a summary of the definitions and relationships of the seven (7) types of abilities of this invention that can be readily understood and applied by those skillful in the art:

Type I encompass cognitive abilities consisting of a level of information processing skill applied to a level of knowledge in a specific field. Examples of information processing skills are remembering, discriminating, sorting, identifying, classifying, understanding, problem solving and creativity. Information obtained through actions (enactive), imagery (iconic) and symbols (symbolic) is usually required in almost all roles and is, therefore, included in the algorithm of this invention, although most psychological tests exclusively test symbolic information communicated and assimilated through reading and speech.

Type II encompass affective abilities consisting of a level of feeling, predisposition or attitude toward a specific entity or activity. Examples of attitude scales are empathy-insensitivity, feeling free-controlled, fearing-not fearing, expecting success-failure and valuing-not valuing. Requirements for affective abilities can be both a minimum and a maximum, e.g., depending on particular culture a bill collector may be required to have some but not too much empathy.

Type III encompass physiological abilities consisting of a psychomotor process resulting in a level of biophysical performance. Examples of physiological abilities are specific health resiliency, stress management, gross motor, fine motor, vision, hearing, speaking, body language and sexual performance.

Type IV encompass strategical abilities consisting of a level of range (or repertoire size) and a level of complexity (or number of issues simultaneously addressed) in appropriate specific strategies implemented. Examples of strategic abilities are analyzing, planning, communicating (i.e., exchanging understandings), monitoring and appraising in situations missing or ambiguous information. In situations without missing or ambiguous information, the required abilities are of a Type I problem-solving nature, involving finding and implementing a right course of action. In real life situations, however, executing effective strategies always involves consideration of missing and/or conflicting information. Type IV strategic abilities are, therefore, also described as executive skills. Requirements for such executive skills can be both a minimum and a maximum, e.g., the latter in situations where only stipulated or supervisor-directed procedures are to be implemented.

Type V encompass aesthetic abilities consisting of emotional sensitivity, particularly enjoyment, of a level of the qualities of beauty in one or more modalities of sensory input (i.e., auditory, visual, tactile, gustatory, olfactory, vestibular). Higher level abilities involve more complex and ambiguous inputs, such as of harmonious relationships in an organization, family or individual life. Examples of aesthetic abilities are enjoying beautiful artifacts decorations, music, art, relationships and producing a masterpiece in one's own living.

Type VI encompass ethical abilities consisting of a level of habituation (or consistency) in applying a level of appropriate, specific concern for others. Higher levels of applied concern correspond to more personal integrity and sacrifice, less seeking of personal recognition and more effective contributions to others realizing the fuller potential of their own humanness. Examples of the demonstration of ethical abilities are in commitment to communal responsibilities, consistency in behaving truthfully and honestly (thus contributing to a trusting environment) and anonymous assistance to others in attaining higher level abilities. Requirements for ethical abilities can be both as a minimum and a maximum, the latter, e.g., for a role involving unethical techniques.

Type VII encompass spiritual abilities consisting of a level of striving to extend one's humanness through connection with a metaphysical ideal. Examples of the demonstration of spiritual abilities is in appreciation of the vast inheritance reflected in one's own opportunity to live as a human being, humility and commitment in everyday living to seek and serve an understanding of an ultimate meaning for human life.

Referring to FIG. 4b, there are provided examples of abilities underlying each of the higher numbered ability types in this invention as summarized in the extreme right column of FIG. 4a. The typology of abilities used in the algorithms and procedures of this invention consist of both the seven types of abilities and the relationship between lower and higher numbered types. A feature of this invention is that it facilitates easy and reliable determinations of relative capability levels of role requirements and individual's attainment. Once an individual has the required underlying abilities as defined and identified in accordance with the typology depicted in FIGS. 4a and 4b, he or she will only require practice in their appropriate application to develop the capability to fulfil role and task responsibilities and to develop technique mastery. Individuals not having attained required underlying abilities are only able, if at all, to succeed in a role and situation after a trial and error process through which the required abilities or some substitutes are assimilated.

Referring to FIG. 4b, the method of this invention for matching behavioral requirements with individuals' ability attainments and for managing attainment improvement interventions is significantly enhanced by additionally identifying ability attainments of particular domain-types that have been found underlying the attainment of abilities of other domain-types. Systematic addressing of the identification of such underlying abilities increases the effectiveness of subsequent matching and managing by providing insights into the nature of a discrepancy between requirements and attainments. Identifying particularly facilitating relationships in terms of underlays also increases the efficiency of this invention in prescribing the addressing of specific facilitating relationships rather than all possible relationships.

There are many advantages in utilization of the algorithm of this invention applying ability elements as depicted in FIGS. 4a and 4b. It involves a structure of dimensions of behavior generalizable to all roles and situations; the requirements of any role and situation can be meaningfully compared with any other role and situation; the ability attainments of any individual can be meaningfully compared with the ability requirements for any role and situation; the scales developed for dimensions represent paths for the further development of individuals' ability attainments. Measurement of individual's attainment of the process component of Type I cognitive abilities, Type IV strategic abilities, Type V aesthetic abilities and Type VI ethical abilities are generalizable to content, providing the process is not inhibited by Type II attitudes or Type III physical limits to the particular content. (For example, if individuals have been evaluated as capable of solving chemistry problems they only have to assessed in their master of biology specific knowledge and possible inhibiting attitudes and physical limitations to be evaluated as being capable of solving biology problems.) Application of the abilities algorithm of this invention can be usefully applied in steps, e.g., starting with only the lowest numbered types of abilities, and is ultimately applicable to the foreseeably most advanced developed organizations and societies. (The development of organizations and civilizations may be defined as increases in required abilities in the higher numbered types of abilities and increases in the levels of required underlying abilities in the lower numbered types of abilities.) Furthermore, the method of this invention for defining capability requirements and attainments in terms of abilities, as illustrated in FIGS. 4a and 4b, uses concepts and language that are easily understood and adaptable by worldwide practitioners in the various fields concerned with the optimum development, remediation and utilization of the behavioral capabilities of human beings.

The examples of each type abilities identified in the above and in FIG. 4a have been found adequate for most roles and situations. Additional dimensions, however, may be readily defined within the structure here recited to accommodate ongoing changes in roles and situations worldwide. It is anticipated, for example, that additional dimensions will be required to accommodate specific culture requirements as the methods of this invention become adopted in nations foreign to western civilization, especially for aesthetic, ethical and spiritual(Types V, VI and VII) types of abilities. Also, scales with different ranges, sensitivities and selectivities are anticipated to accommodate different applications within the overall structure of the algorithm of this invention. Further, within the typology illustrated in FIGS. 4a and 4b, specific methods have been invented to facilitate the construction of scalable dimensions for specific types of capabilities:

for specifying required cognitive capabilities as dimensions of type I abilities:
defining both process and content components for the ability;
defining the level of the process on a scale calibrated by behavioral indicators with invariant parameters;
defining the level of the content on a scale calibrated by behavioral indicators with invariant parameters; and
defining the level of the required ability as both levels of the process and of the content on respective scales calibrated by behavioral indicators with invariant parameters.

for specifying motivation capabilities required to successfully carry-out a role, task or technique, as a dimension of type II abilities:
defining as the index of required motivation the product of the level of individual's perceived probability of succeeding and the level of individual's perceived net positive relative value associated with the set of consequences of successfully carrying-out such role, task or technique, according to the following formulation:

MOTIVATION INDEX=PERCEPTION: (Achievement Probability (Value (Consequences−Effort)))

By this method, motivation is defined as the product of two factors. If either factor is zero, the measured motivation will be zero. An individual identified as perceiving no chance of succeeding will be evaluated as having zero motivation. Also, an individual identified as valuing the effort required to succeed as being equal to or greater than the value of the consequences of succeeding will be evaluated as having zero or negative motivation. This invention algorithm's approach thus provides a more discriminative and useful measurement of what is commonly addressed as an overall personality trait such as self-confidence or assertiveness.

for specifying stress management capabilities as a dimension of type III abilities required in successfully carrying-out a role, task or technique:
defining the maximum perceived rate of change level in sensory inputs that an individual must sustain without deterioration in his or her other performance capabilities;
defining the minimum perceived rate of change level in sensory inputs that an individual must sustain without deterioration in his or her other performance capabilities; and
defining the maximum level of tension that an individual must endure without deterioration in his or her other performance capabilities.

Figure 5:
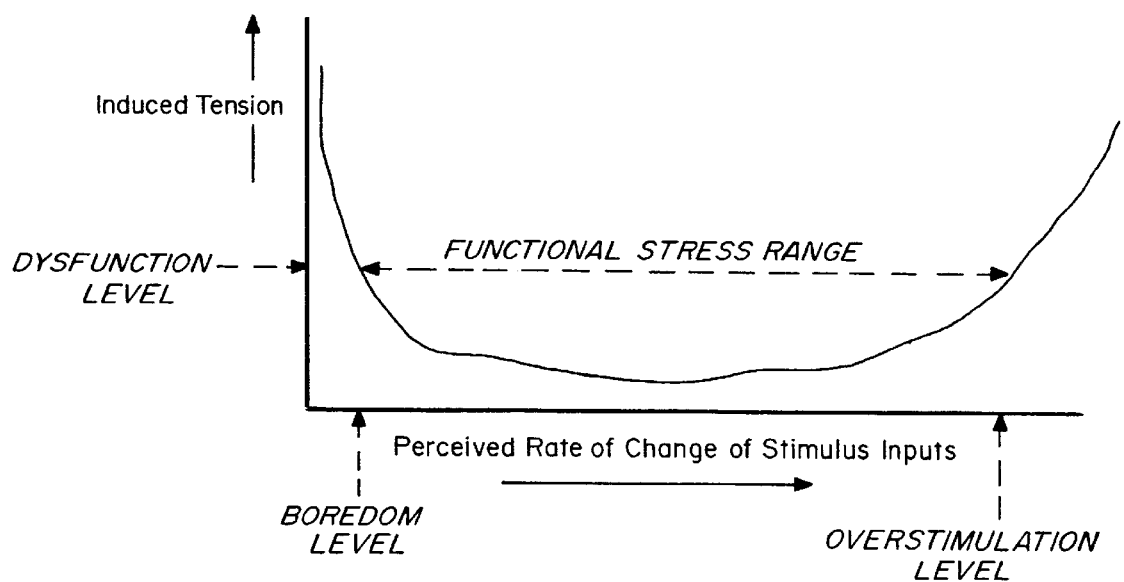
FIG. 5 is a graph depicting the relationship of type III ability elements used to define stress management capability in the algorithm for constructing a multidimensional structure as a gauge for matching individual's capabilities with behavioral requirements.

The relationship between these three variables is illustrated in FIG. 5, there identified, respectively, as OVERSTIMULATION LEVEL, BOREDOM LEVEL, and DYSFUNCTION LEVEL. FIG. 5, a fourth variable, FUNCTIONAL STRESS RANGE, can be calculated as the difference between OVERSTIMULATION LEVEL and BOREDOM LEVEL.

for specifying strategic capabilities as a dimension of type IV abilities required in successfully carrying-out a role, task or technique:
defining the maximum level of complexity in the strategies that an individual must implement; and
defining the maximum level of the range of alternative strategies or of the size of strategy repertoire that an individual must implement.

for specifying aesthetic capabilities as a dimension of type V abilities required in successfully carrying-out a role, task or technique:
defining the maximum level of sensitivity to the qualities comprising beauty in each required mode of sensory input.

for specifying ethical capabilities as a dimension of type VI abilities required in successfully carrying-out a role, task or technique:
defining the maximum level of skill in appropriately expressing concern for others; and
defining the required maximum level of consistency in such expression.

Figure 3A:
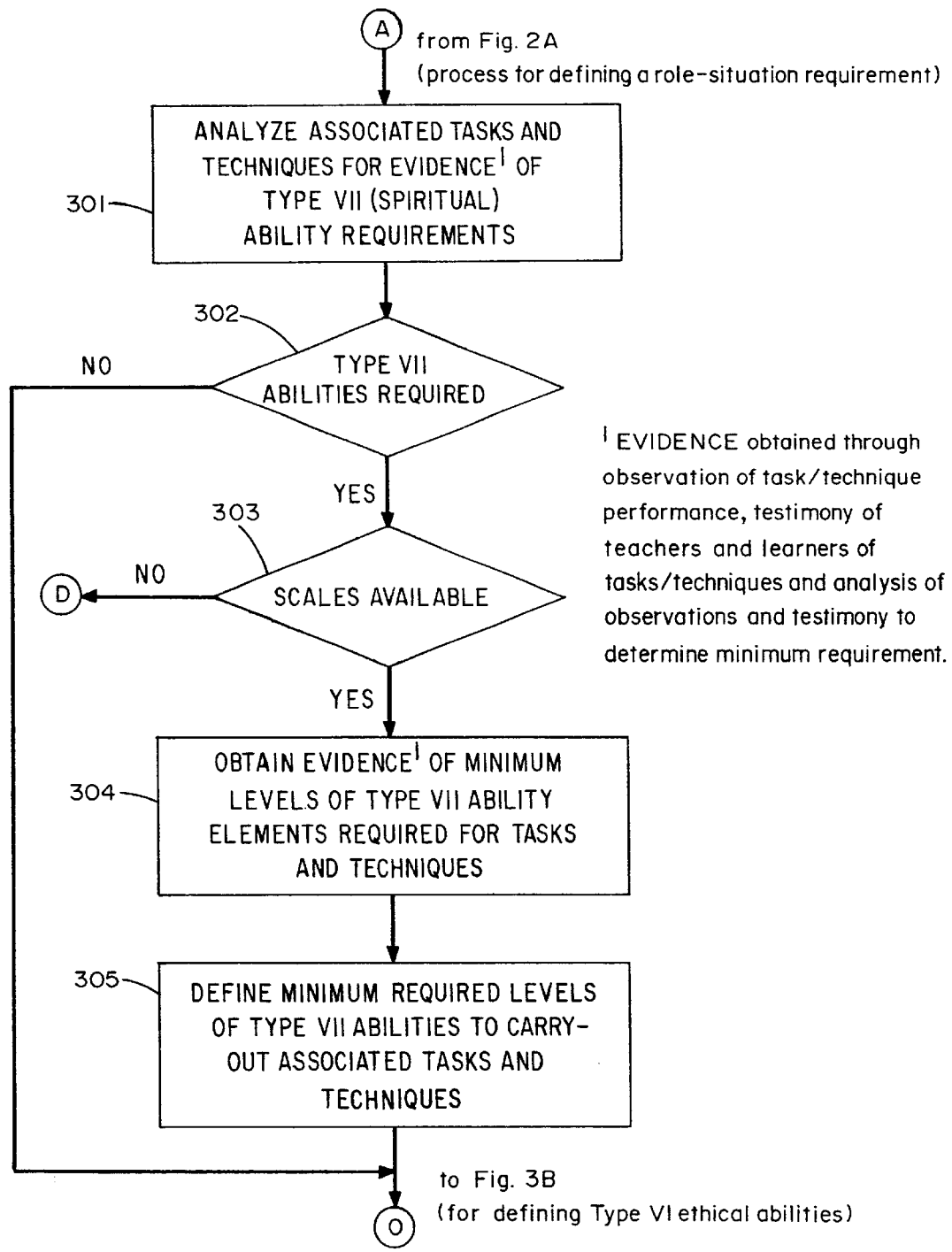

In accordance with the definitions of abilities in FIGS. 4a and 4b, in defining capability requirements for particular roles and situations it is most efficient to start with the highest numbered type of ability, Type VII spiritual, as higher numbered ability types have prerequisite lower numbered types and not the reverse. Accordingly, after the process of block 203 in FIG. 2a, the process for defining required capabilities for a particular role situation proceeds to analyze its required tasks and techniques to establish what, if any, type V!! spiritual abilities are required as depicted in FIG. 3a (block 301). Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 302 of FIG. 3a. If the decision is made that type VII spiritual abilities are not required for the particular role and situation, then the process proceeds to analyze what, if any, type VI ethical abilities are required as depicted in FIG. 3b (block 306).

If the decision is made that type VII spiritual abilities are required then the process proceeds to determine if scales are already available for the particular, required type VII spiritual abilities, depicted as block 303 of FIG. 3a. If scales are already available for the required abilities, then evidence of the minimum required levels of such type VII spiritual abilities is obtained as depicted in block 304, using the same methods as used to obtain evidence in the step depicted as block 301, the minimum levels of each required dimension of type VII spiritual abilities is defined as depicted in block 305 and the process, then, proceeds to analyze what if any, type VI ethical abilities are required as depicted in FIG. 3*b* (block 306).

Figure 3B:
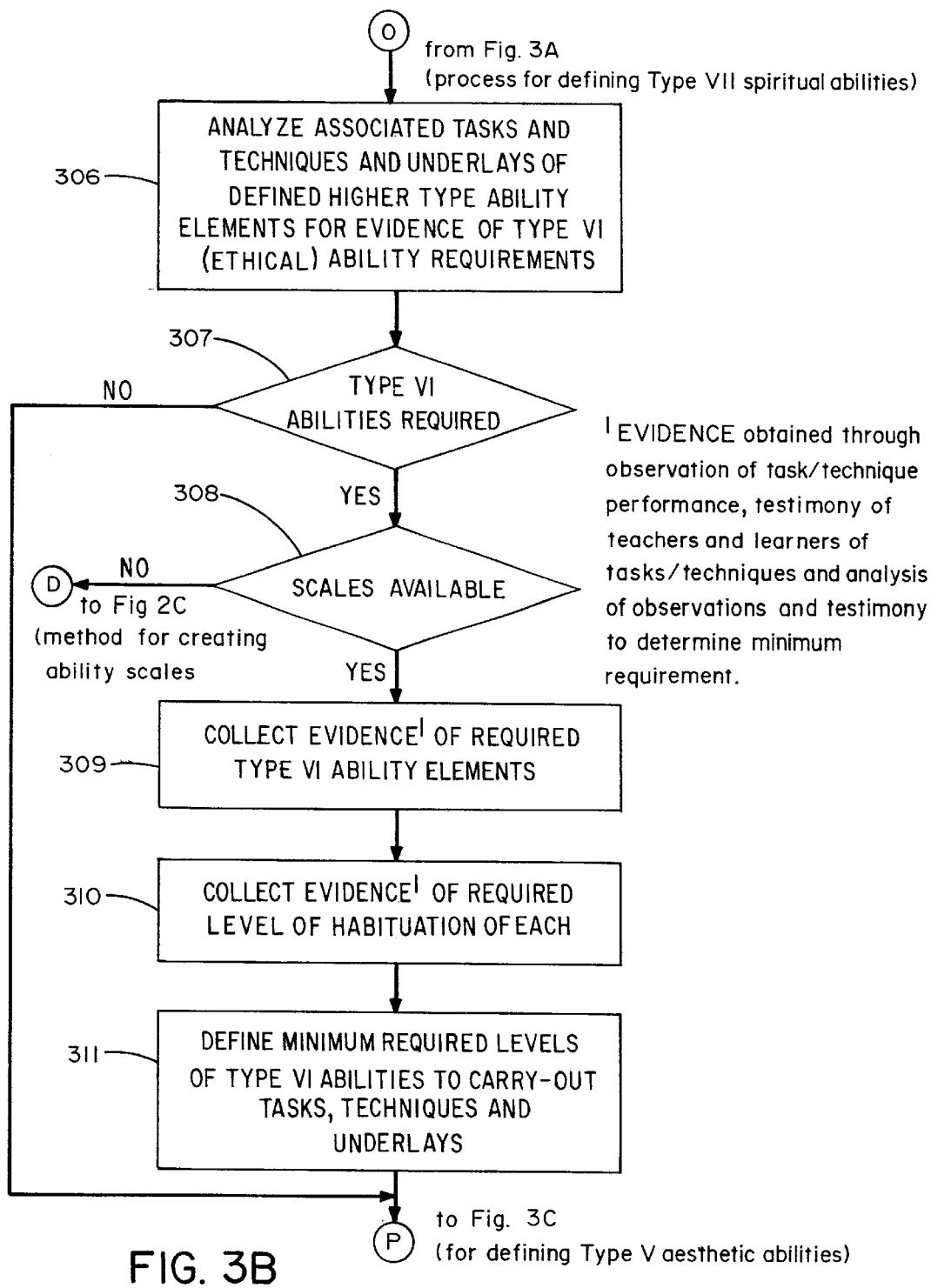

Referring to FIG. 3*b*, the process for defining required capabilities for a particular role situation proceeds to analyze its required tasks, techniques and underlays of required spiritual ability elements to establish what, if any, type V! ethical abilities are required as depicted in block 306. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 307 of FIG. 3*b*. If the decision is made that type VI ethical abilities are not required for the particular role and situation, then the process proceeds to analyze what, if any, type V aesthetic abilities are required as depicted in FIG. 3*c* (block 312).

If the decision is made that type VI ethical abilities are required then the process proceeds to determine if scales are already available for the particular, required type VI ethical abilities, depicted as block 308 of FIG. 3*b*. If scales are already available for the required abilities, then evidence of the minimum required levels of such type VI ethical abilities is obtained as depicted in blocks 309 and 310, using the same methods as used to obtain evidence in the step depicted as block 306, the minimum or maximum levels (as appropriately required in the specific role and situation) of each required dimension of type VI ethical abilities is defined as depicted in block 311 and the process, then, proceeds to analyze what if any, type V aesthetic abilities are required as depicted in FIG. 3*c* (block 312).

Figure 3C:
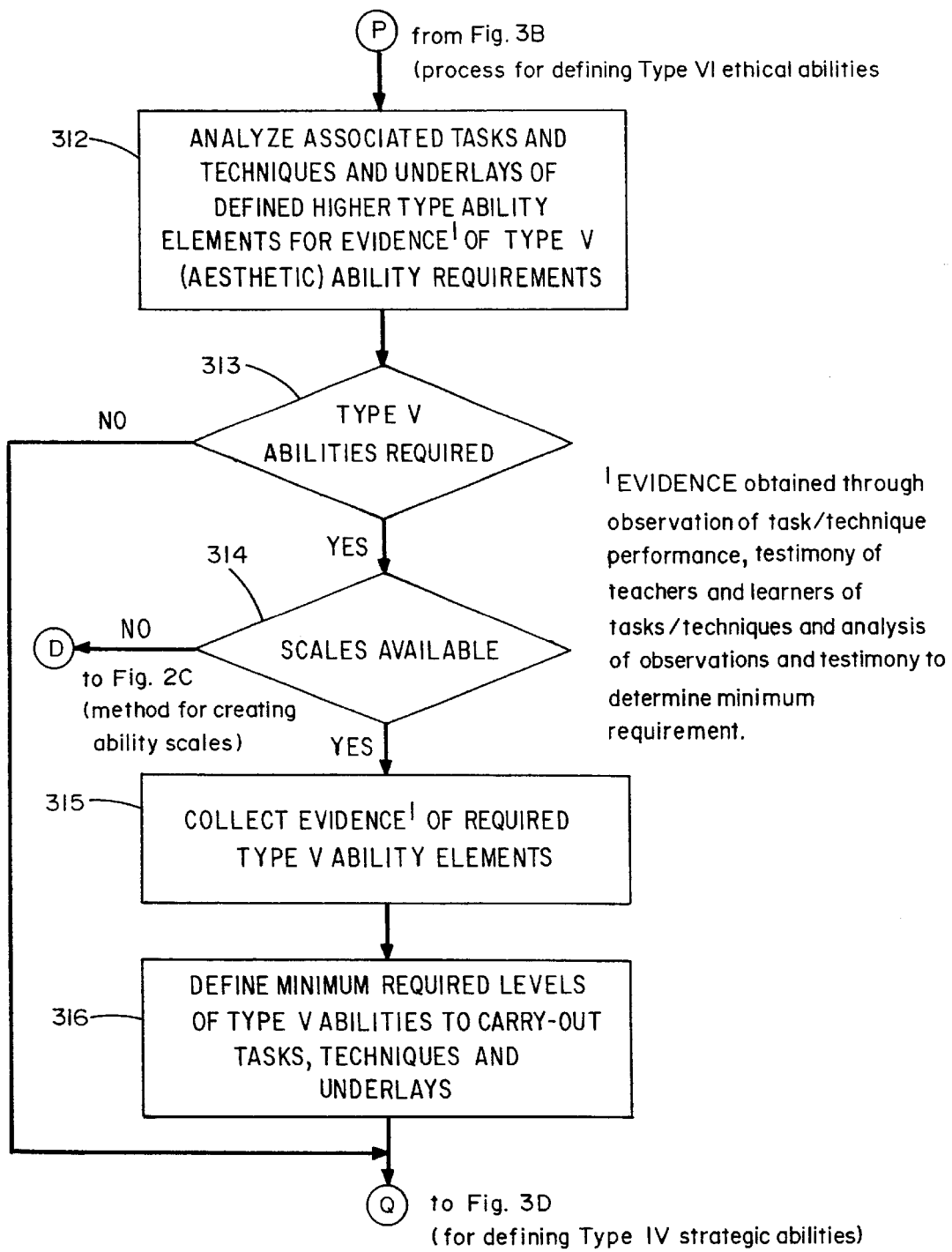

Referring to FIG. 3*c*, the process for defining required capabilities for a particular role situation proceeds to analyze its required tasks, techniques and underlays of defined higher type ability elements to establish what, if any, type V aesthetic abilities are required as depicted in block 312. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 313 of FIG. 3*c*. If the decision is made that type V aesthetic abilities are not required for the particular role and situation, then the process proceeds to analyze what, if any, type IV strategic abilities are required as depicted in FIG. 3*d* (block 317).

If the decision is made that type V aesthetic abilities are required then the process proceeds to determine if scales are already available for the particular, required type V aesthetic abilities, depicted as block 314 of FIG. 3*c*. If scales are already available for the required abilities, then evidence of the minimum required levels of such type V aesthetic abilities is obtained as depicted in block 315, using the same methods as used to obtain evidence in the step depicted as block 312, the minimum levels of each required dimension of type V aesthetic abilities is defined as depicted in block 316 and the process, then, proceeds to analyze what if any, type IV strategic abilities are required as depicted in FIG. 3*d* (block 317).

Figure 3D:
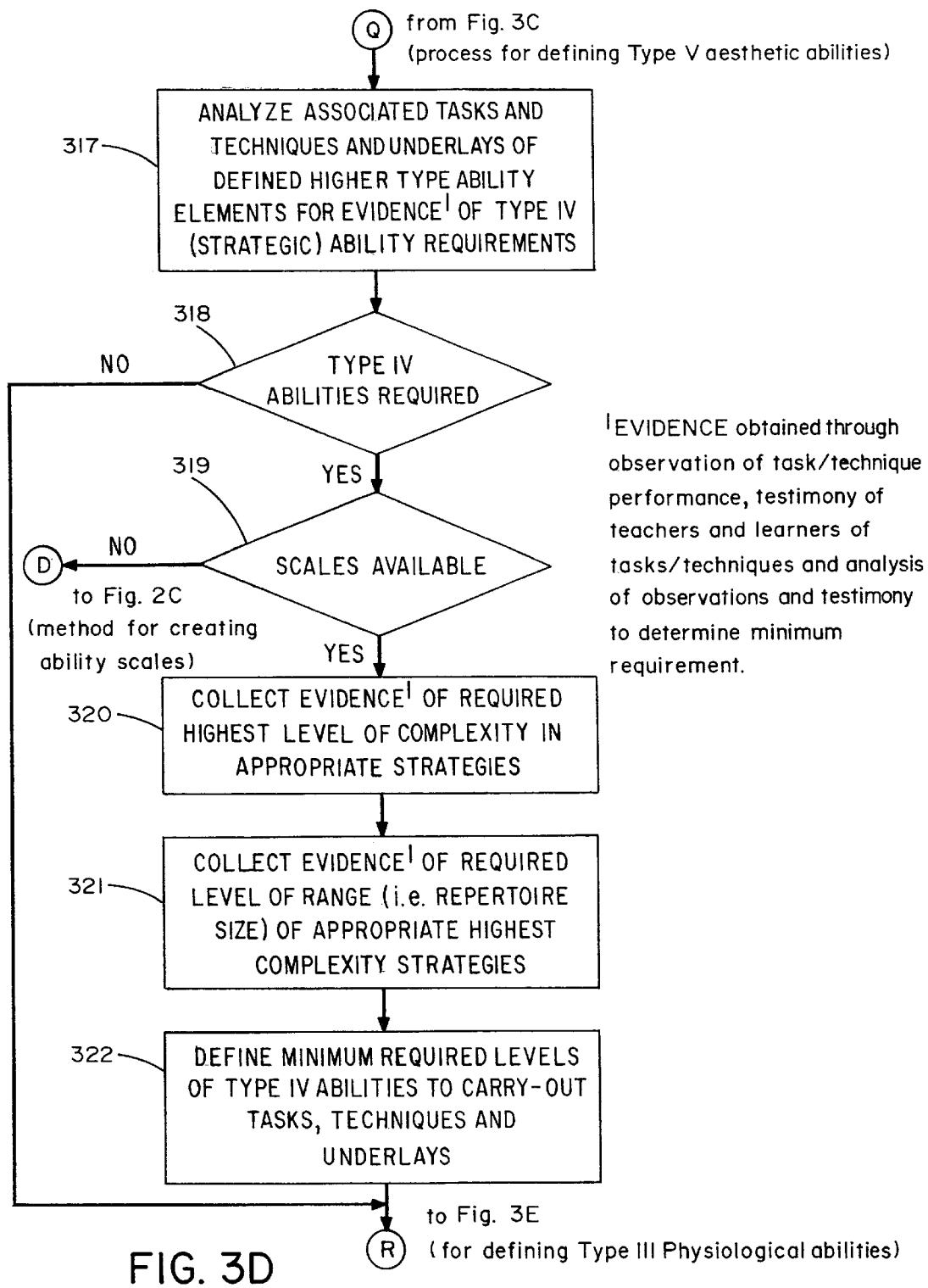

Referring to FIG. 3*d*, the process for defining required capabilities for a particular role situation proceeds to analyze its required tasks, techniques and underlays of defined higher type ability elements to establish what, if any, type IV strategic abilities are required as depicted in block 317. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 318 of FIG. 3*d*. If the decision is made that type IV strategic abilities are not required for the particular role and situation, then the process proceeds to analyze what, if any, type III physiological abilities are required as depicted in FIG. 3*e* (block 323).

If the decision is made that type IV strategic abilities are required then the process proceeds to determine if scales are already available for the particular, required type IV strategic abilities, depicted as block 319 of FIG. 3*d*. If scales are already available for the required abilities, then evidence of the minimum or maximum (as appropriately required in the particular role and situation) required levels of such type IV strategic abilities is obtained as depicted in blocks 320 and 321, using the same methods as used to obtain evidence in the step depicted as block 317, the required minimum or maximum levels of each dimension of type IV strategic abilities is defined as depicted in block 322 and the process, then, proceeds to analyze what if any, type III physiological abilities are required as depicted in FIG. 3*e* (block 323).

Figure 3E:
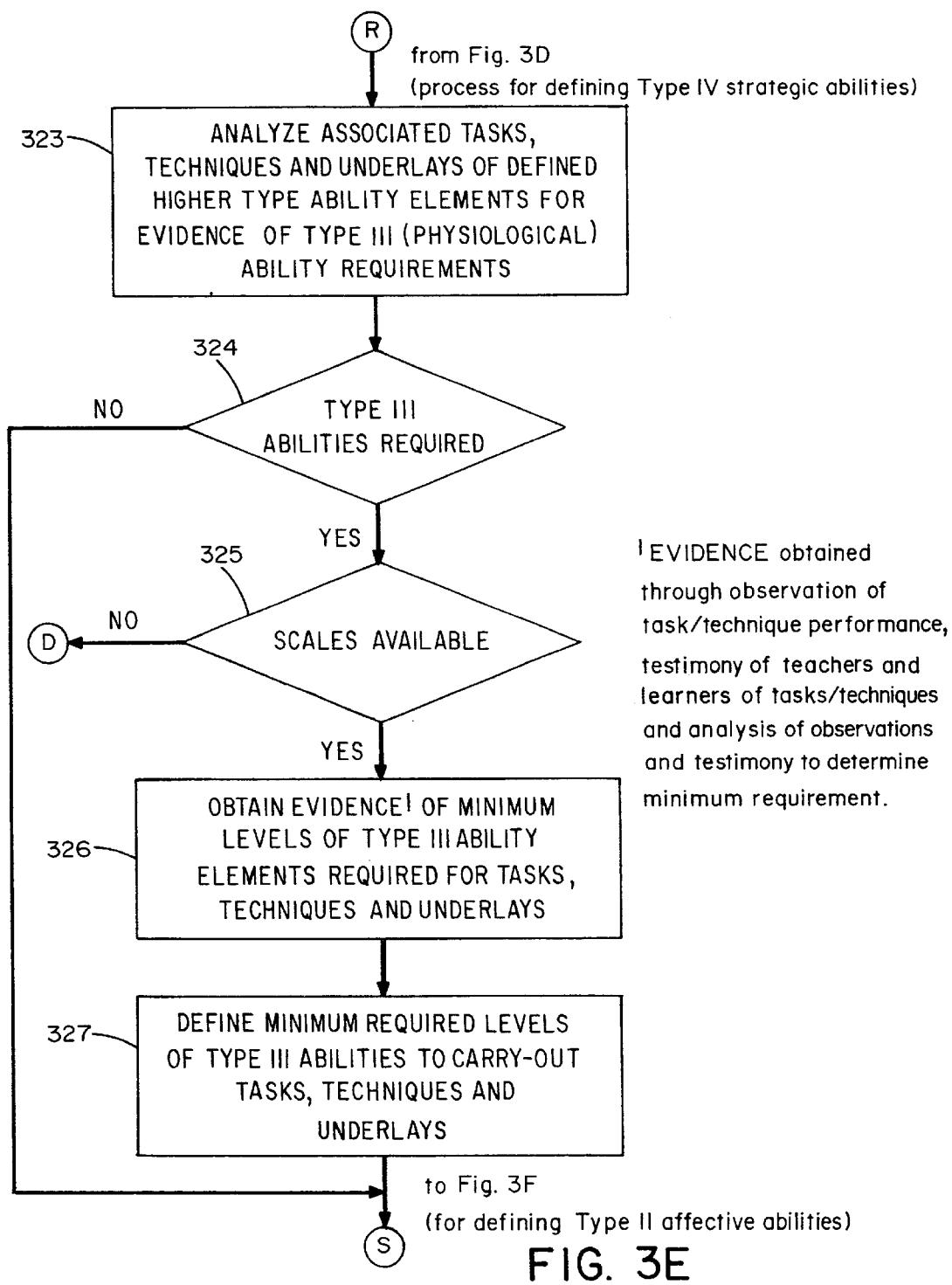

Referring to FIG. 3*e*, the process for defining required capabilities for a particular role situation proceeds to analyze its required tasks, techniques and underlays of defined higher type ability elements to establish what, if any, type III physiological abilities are required as depicted in block 323. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 324 of FIG. 3*e*. If the decision is made that type III physiological abilities are not required for the particular role and situation, then the process proceeds to analyze what, if any, type II affective abilities are required as depicted in FIG. 3*f* (block 328).

If the decision is made that type III physiological abilities are required then the process proceeds to determine if scales are already available for the particular, required type III physiological abilities, depicted as block 325 of FIG. 3*e*. If scales are already available for the required abilities, then evidence of the minimum required levels of such type III physiological abilities is obtained as depicted in block 326, using the same methods as used to obtain evidence in the step depicted as block 323, the minimum levels of each required dimension of type III physiological abilities is defined as depicted in block 327 and the process, then, proceeds to analyze what if any, type II affective abilities are required as depicted in FIG. 3*f* (block 328).

Figure 3F:
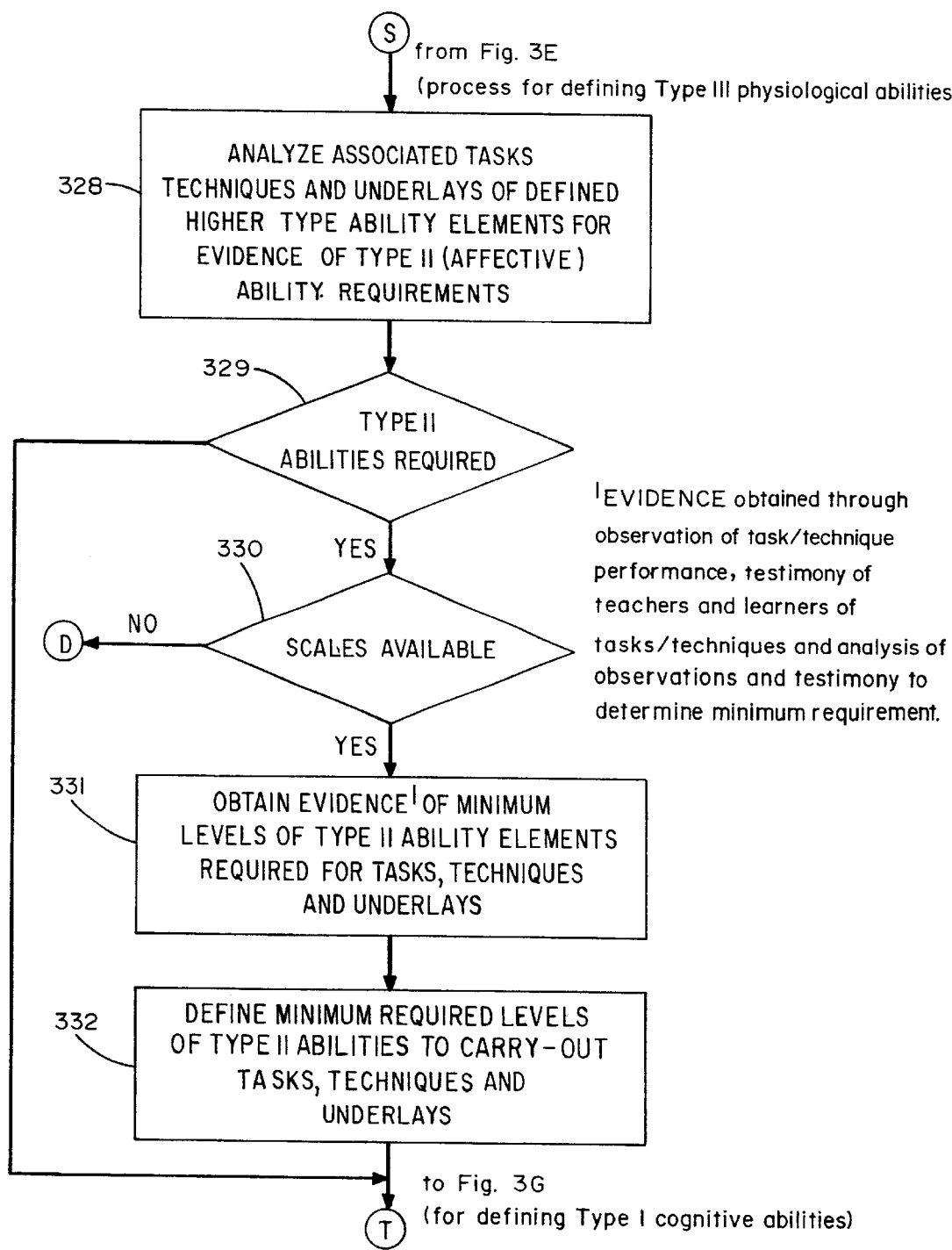

Referring to FIG. 3*f*, the process for defining required capabilities for a particular role situation proceeds to analyze its required tasks, techniques and underlays of defined higher type ability elements to establish what, if any, type II affective abilities are required as depicted in block 328. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. A decision is then made as depicted in block 329 of FIG. 3f. If the decision is made that type II affective abilities are not required for the particular role and situation, then the process proceeds to analyze what type I cognitive abilities are required as depicted in FIG. 3g (block 333).

If the decision is made that type II affective abilities are required then the process proceeds to determine if scales are already available for the particular, required type II affective abilities, depicted as block 330 of FIG. 3f. If scales are already available for the required abilities, then evidence of the minimum or maximum (as appropriately required in the particular role and situation) required levels of such type II affective abilities is obtained as depicted in block 331, using the same methods as used to obtain evidence in the step depicted as block 328, the required minimum or maximum levels of each dimension of type II affective abilities is defined as depicted in block 332 and the process, then, proceeds to analyze what type I cognitive abilities are required as depicted in FIG. 3g (block 333).

Figure 3G:
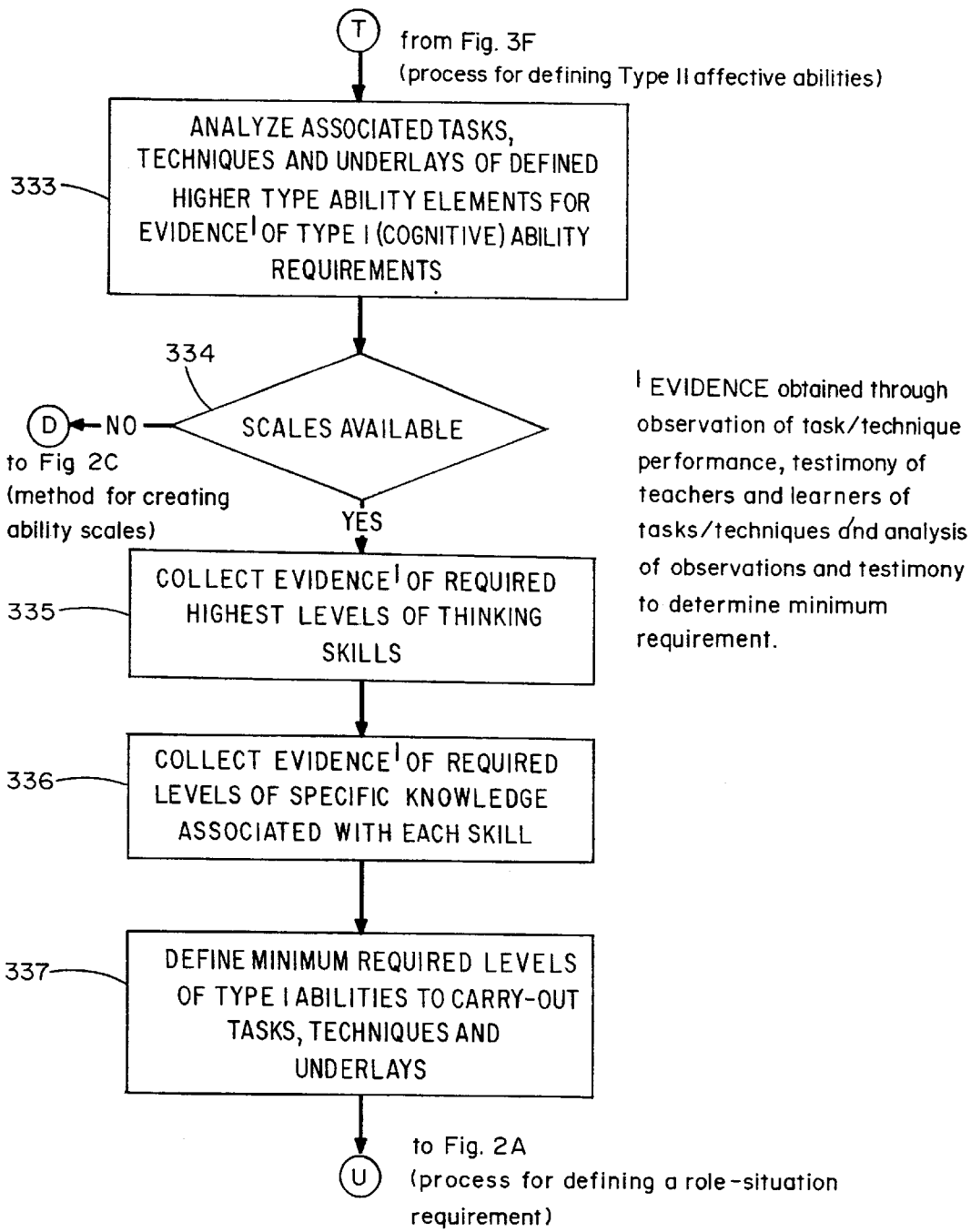

Referring to FIG. 3g, the process for defining required capabilities for a particular role situation proceeds to analyze its required tasks, techniques and underlays of defined higher type ability elements to establish what type I cognitive abilities are required as depicted in block 333. Evidence of such requirements may be obtained from observation of incumbents in the role, from ethnographic techniques and from responses to interviews and questionnaires with incumbents, past role-holders, peers and supervisors, all apparent as appropriate in particular situations to those familiar with the art of collecting and analyzing data on human behavior. The process then proceeds to determine if scales are already available for the particular, required type I cognitive abilities, depicted as block 334 of FIG. 3g. If scales are already available for the required abilities, then evidence of the minimum required levels of such type I cognitive abilities is obtained, for both thinking skills (process) and knowledge (content) as depicted in blocks 335 and 336, using the same methods as used to obtain evidence in the step depicted as block 333, the minimum levels of each required dimension of type I cognitive abilities is defined as depicted in block 337 and the process, then, proceeds to specify what, if any, of the various types of abilities heretofore determined as necessary and sufficient for minimum success in the role and situation, also contribute to superior performance by individuals with higher than the required levels of such abilities, as depicted in FIG. 2a (block 204).

Referring to FIG. 2a (block 204), the process of this invention involves the further definition of abilities that are required for minimally acceptable performance at the level defined as essential but that also that will contribute to superior role performance at higher than required levels. A role as salesperson at a particular company, for example, may require basic levels of abilities affecting driving a car but attaining higher than basic levels in driving related abilities will not facilitate higher levels of performance as a salesperson. In the same salesperson role and situation, however, higher than required levels of language or strategic abilities, as other examples, will very much effect higher levels of performance as a salesperson. This feature further improves the process of this invention for comparing role-situation requirements with individual's attainments and both abilities effecting minimally successful and superior performance are, therefore, stored in a data file as depicted in block 205 and displayed and/or printed as depicted in block 206. A decision is then required in the process of this invention, as depicted in block 207, whether to proceed with matching individuals to the requirement as depicted in FIG. 2d or to quit.

Figure 2B:
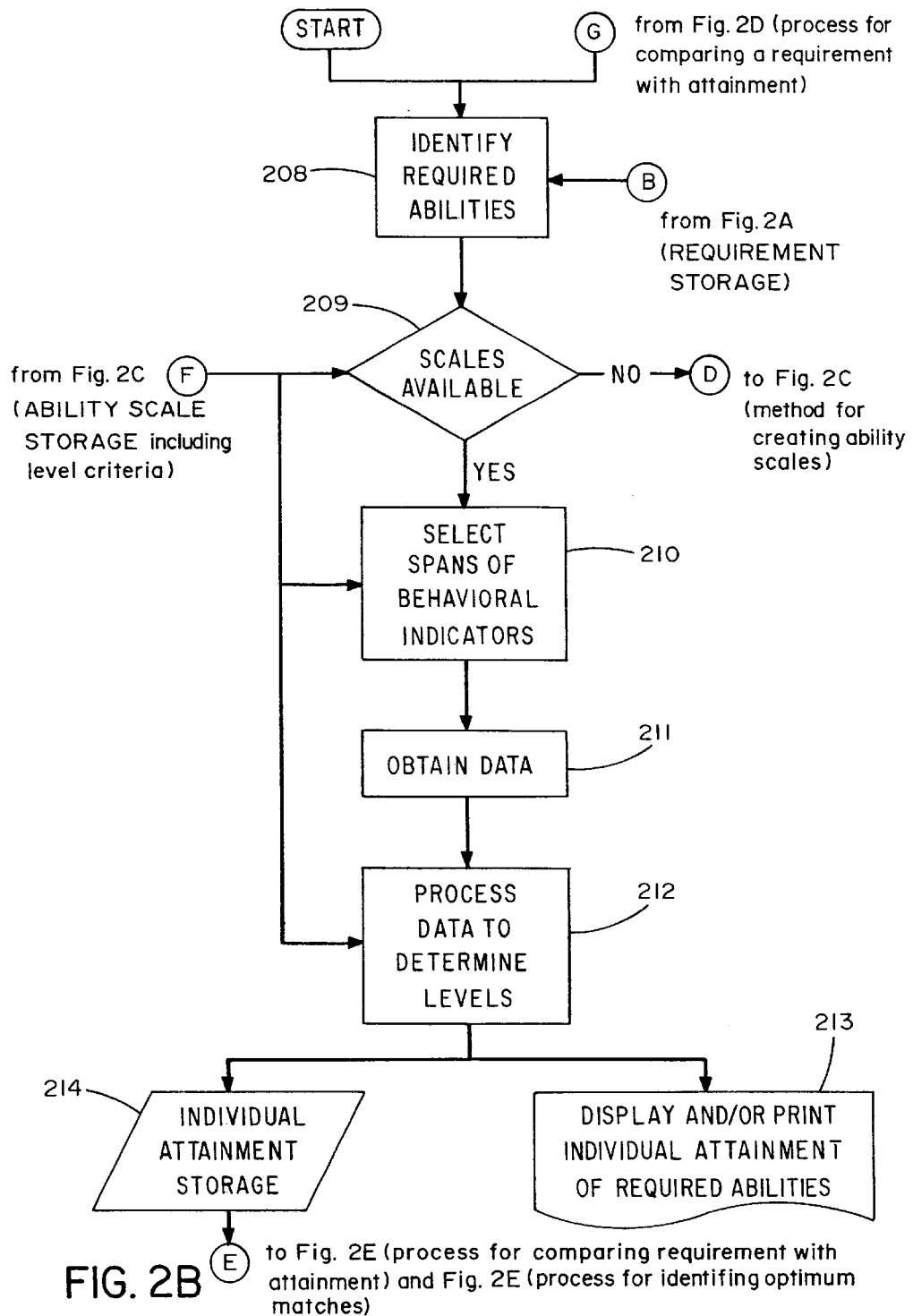
FIG. 2b is a flow chart of the process of the invention for identifying the level of individual's attainment of required abilities.
Figure 2C:
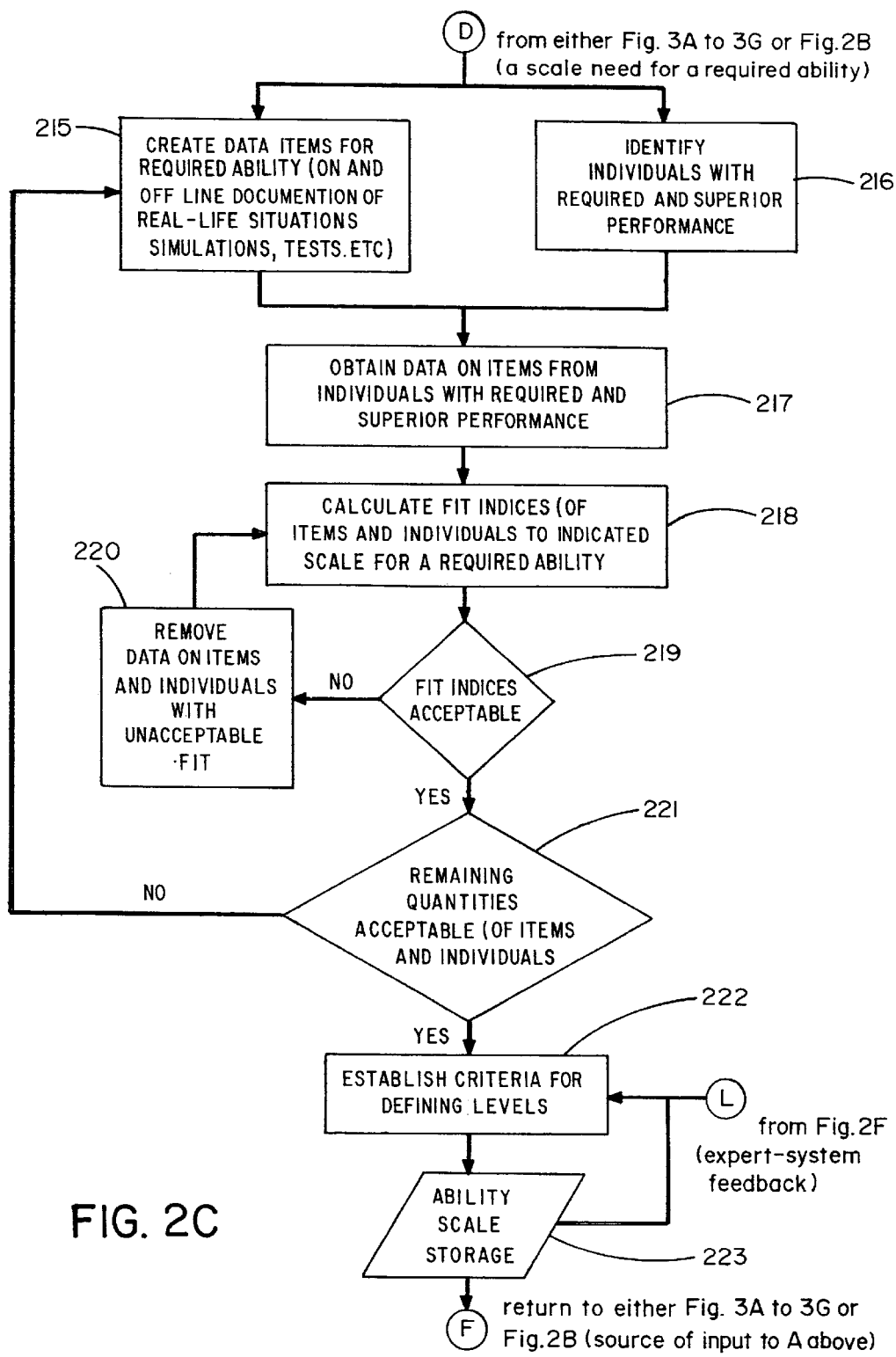
FIG. 2c is a flow chart of the method of the invention for creating ability scales.
Figure 2D:
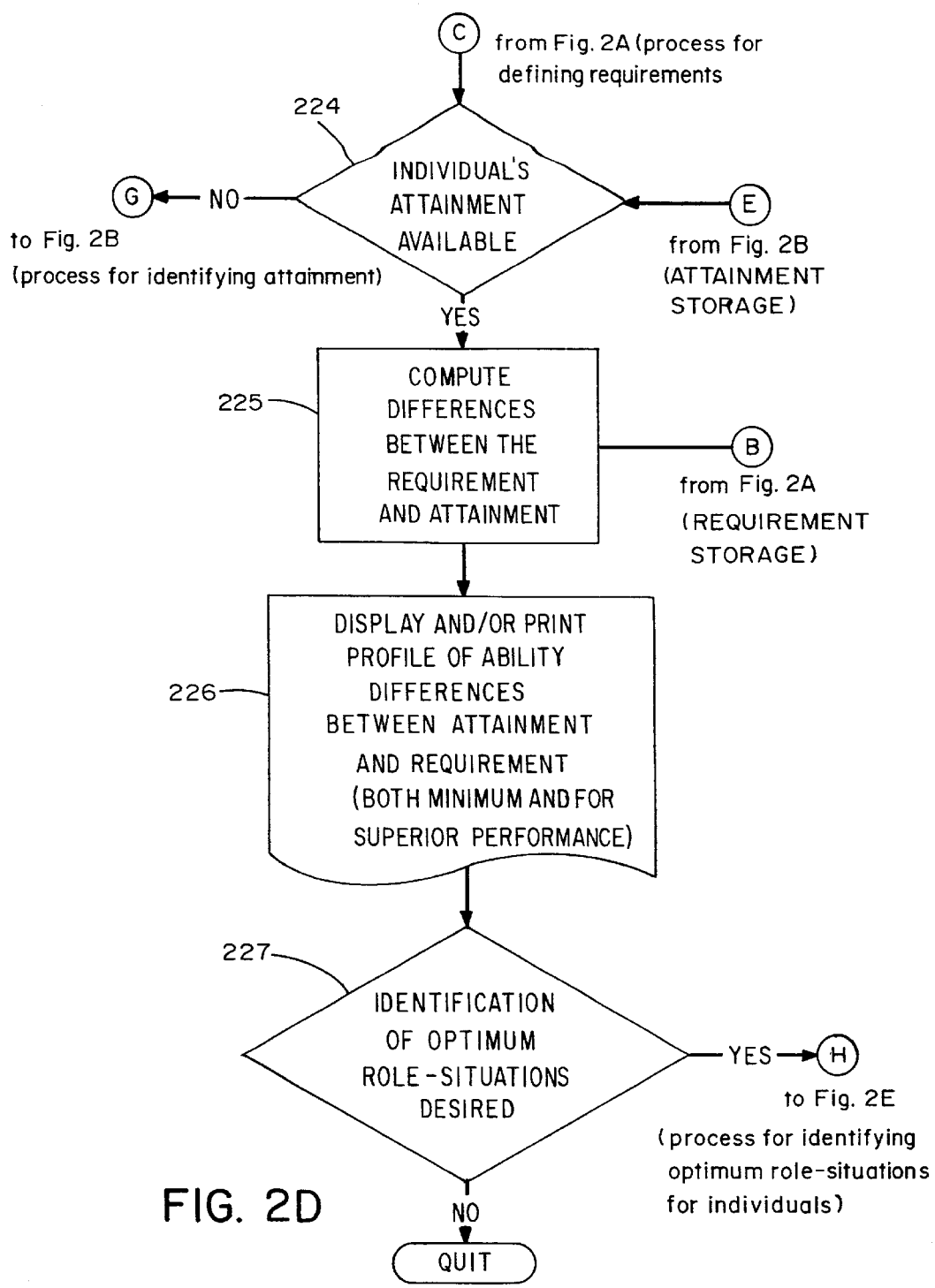
FIG. 2d is a flow chart of the process of the invention for evaluating an individual's capability for a particular role and situation.

Referring to FIG. 2b, there is a flow chart further illustrating the process of block 102 in FIG. 1, expanded to utilize the present invention algorithm for specifying capability requirements for any role and situation in terms of underlying abilities, rather than the disparate bases commonly used, and expanded to also function as part of the present invention system. The process of this invention for identifying an individual's capabilities attainment, as depicted in FIG. 2b, may be initiated independently for a previously determined requirement or as a continuation of a matching process (from process as depicted in FIG. 2d) following a process initiated by defining a role requirement (as depicted in FIG. 2a). Referring to FIG. 2b, the process of this invention for identifying an individual's capability starts with identifying the required abilities for a particular role and situation (block 208) against which the individual's capabilities is to be compared. By this invention an individual's capabilities may be so identified in comparison to the behavioral requirements for any number of roles and situations, each comparison appropriately adding another view of the complex and boundless capabilities of a particular human being. It should be noted that according to this invention it is not possible to evaluate an individual's capabilities without making it as a comparison to a particular role and situation, thus protecting against misuses of the process that are damaging to individuals and that are wasteful and misleading to society. If a specification of the required abilities for a role and situation appropriate to the intended use of identifying the individual's capabilities is not already available, from a data file for requirement storage such as depicted in FIG. 2a (block 205), then the process for identifying an appropriate role-situation requirement, as depicted in FIG. 2a, must be undertaken before undertaking further steps in the process of this invention for identifying an individual's capabilities as depicted in FIG. 2b. After identifying an appropriate set of required abilities, as depicted in FIG. 2b (block 208), it is determined whether scales are already available for each of the dimensions of required abilities (block 209). If a scale for a dimension of required ability is not already available, from a data file for ability scale storage such as depicted in FIG. 2c (block 223), then the process for creating ability scales, as depicted in FIG. 2c, must be undertaken before undertaking further steps in the process of this invention for identifying an individual's capabilities as depicted in FIG. 2b. After determining that scales are available for all required abilities, as depicted in FIG. 2b (block 209), behavioral indicators used as markers of abilities attainment spanning the range of abilities attainment of interest are selected, as depicted in FIG. 2b (block 210)

Data is then obtained on the individual's demonstration and lack of demonstration of each behavioral indicator, as depicted in FIG. 2b (block 211), through psychometric techniques appropriate to each of the behavioral indicators as would be apparent to anyone familiar with the psychometric art. Thus, for example, referring to FIG. 4a, data on behavioral indicators for levels of Type I problem solving and algebra skills could be appropriately obtained through aural, written and/or computer administered tests; data on behavioral indicators for levels of Type II empathy abilities with peers could be appropriately obtained through observations of the individual in natural settings with peers, testimony of peers and supervisors in the peer settings and/or the record of interventions of the individual in computer simulations of peer settings; data on behavioral indicators for levels of Type III finger dexterity or boredom tolerance abilities could be appropriately obtained by administering any of the commercially available finger dexterity or stress tolerance tests, through computer administered dexterity tasks and/or through computer administered simulations while monitoring any of the recognized indicators of tension (e.g., temperature, blood pressure, pulse rate); data on behavioral indicators for levels of Type IV range or complexity of executive communicating, appraising, analyzing, planning or monitoring abilities could be appropriately obtained through observations of the individual in executive roles in ambiguous situations and/or the record of the interventions of the individual in assumed executive roles in computer simulations of ambiguous situations; data on behavioral indicators for sensitivity to levels of Type V qualities of beauty could be obtained through ratings following interviews of the individual by recognized connoisseurs in the particular mode of sensory input and/or computer simulations of such ratings based on a computer matching of the discrimination and appreciation of subtleties by the individual and by connoisseurs; data on behavioral indicators for levels of consistency and concern expressed as Type VI ethical abilities could be obtained through observations of the individual in real-life situations where such expressions are appropriate, by interviews with peers and supervisors of the individual who have previously been in real-life situations with the individual where such expressions are appropriate and/or analysis of the interventions of the individual in computer simulations of situations where such interventions as well as interventions indicative of other abilities are appropriate; data on behavioral indicators of levels of Type VII humility, faith, subservience and commitment abilities enabling putting aside one's own worldly interests for a metaphysical ideal could also be obtained through observations of the individual in real-life situations where such expressions are appropriate, by interviews with peers and supervisors of the individual who have previously been in real-life situations with the individual where such expressions are appropriate and/or analysis of the interventions of the individual in computer simulations of situations where such interventions as well as interventions indicative of other abilities are appropriate. Although, as here described, the methods of this invention may be applied without any of the apparatuses or systems of this invention, the apparatuses and systems of this invention facilitate the collection of data in the process of this invention for identifying an individual's capabilities as depicted in FIG. 2b (block 211).

After obtaining data indicative of the level of the individual's attainment of all required abilities, as depicted in FIG. 2b (block 211), the process for identifying the individual's levels in the various required dimensions of ability is concluded, as depicted in FIG. 2b by processing and analyzing the data in accordance with the criteria for defining specific levels as established in creating and revising ability scales (block 212), displaying and/or printing the level's of individual attainment of required abilities (block 213) and storage of all the original data and determined levels (block 214). It should be noted that an important feature of this process invention is the periodic improvement in the predictive validity of all ability level determinations, through revision of the criteria for establishing levels as depicted in FIG. 2c (block 222) with expert system feedback and through subsequent reprocessing of all data on individual's attainments in storage depicted as block 214 in FIG. 2b.

If in any steps of the methods of this invention it is determined that scales of the required abilities are not already available, either in the process for defining capabilities for a role and situation as depicted in FIGS. 3a to 3g blocks 303, 308, 314, 319, 325, 330, 334 or in the process for identifying an individual's levels of attainment of required abilities as depicted in FIG. 2b block 209, then the process of this invention for establishing such scales is undertaken as depicted in FIG. 2c. Referring to FIG. 2c, a first step in the process is to select or create a pool of data items hypothesized as behavioral indicators of different ability levels within the estimated range of attained abilities in the individuals to be matched, as depicted in block 215. It is important that the estimated range encompass levels below and above possible required levels as, of course, the resultant scales cannot be used to identify a level for which there is not a validated indicator, same as a ruler with markings every foot starting at three feet would be useless in selecting lengths above 18 inches from among a population of lengths between 12 inches and 24 inches. Identification of behavioral indicators around targeted levels has been best obtained from the testimony of recognized high level attainers who have recollections of their progressing through lower levels and from professional service providers undertaking to assist individuals in attaining higher levels. It is anticipated that information on behavioral indicators can also be obtained through trained observers in real-life situations and through processing of data obtained on individuals in interactive simulated situations. It is also anticipated that for some purposes of matching or managing behavioral attainments, extremely sensitive scales may be required to identify slight changes in attainments that may be significant in individuals with behavioral attainment problems, e.g., autistic individuals.

Another first step in the process depicted in FIG. 2c (block 216) is identifying a representative pool of three or more (the more, the better) available individuals with known minimally successful and superior performance capabilities, preferably, in the role and situation for which the ability scale is intended to be used. If sufficient individuals are not available with known performance capabilities in the particular role and situation for which the ability scale is intended to be used, then individuals can be identified as having minimally successful and superior performance in roles and situations analyzed as requiring similar levels of the ability to be scaled. It should be here noted that the first steps in the process of this invention for creating ability scales, as described in the above and depicted in FIG. 2c (blocks 215 and 216), are recognized as approximations which will be perfected as these scales are validated and adjusted through the expert system capabilities of the invention process, specifically through the process depicted in FIG. 2f and the introduction of new criteria for defining levels of ability scales into the process depicted as FIG. 2c (block 222). Data is then obtained, as depicted in FIG. 2c block 217, on each of the individual's (identified in the process depicted as block 216) demonstration and lack of demonstration of each behavioral indicator (selected or created in the process depicted as block 215) through psychometric techniques appropriate to each of the behavioral indicators as would be apparent to anyone familiar with the psychometric art, same as described above in detail for the process depicted in FIG. 2b block 211.

The third step in the process of this invention for creating ability scales, depicted as FIG. 2c block 218, involves processing the data on identified items and individuals utilizing one or more models of item response theory designed to establish invariant parameters on the probability of persons with particular ability levels demonstrating the behavior indicated by each data item and indices of the fit of the data on each item, and of the data on each individual, to the resultant overall scale of ability level indicators. Various applications and models item response theory have become well known to those familiar with the field of Psychological Testing (see discussions of *Item Response Theory* in Anastasi, Anne (1988). *Psychological Testing,* sixth edition. New York: Macmillan Publishing, pp. 219–224 and in Wright, Benjamin and Linacre, John M. (1984). *Microscale Manual* Westport, Conn.: Mediax Interactive Technologies, chapter 5 The inventors have used a commercially available statistical program for use on IBM PC type computers—MICROSCALE—(ibid.) in carrying out such processing.

The fourth step of the process of this invention for creating ability scales, depicted as FIG. 2c block 219, is deciding whether the calculated fit indices of each item and each individual is acceptable. Data on items and individuals with unacceptable fit are then eliminated, as in the process of block 220, and the fit indices of the remaining items and individuals are recalculated as in block 218. When satisfactory fit indices are achieved for a satisfactory number of items (as determined in the process depicted as block 221) for the range and sensitivity requirements of the particular ability scale, then criteria are established for defining levels on the overall scale as in the process depicted as block 222 and the items and criteria defining the particular ability scale are stored for future usage as the process depicted in block 223.

The step of establishing criteria for defining levels of abilities, as depicted in block 222, is particularly important to the effectiveness of this invention. With ideal scales composed of ideal behavior indicators, an individual would demonstrate satisfactory performance on all indicators of ability below his or her attainment level and unsatisfactory performance on all indicators of ability above his or attainment level. Behavior indicators and human performance, however, are always less than ideal in real life. The inventor has initially used as criteria for establishing the ability level of an individual, e.g., that level of the dimension at which the individuals demonstrates satisfactory performance of a minimum of sixty (60) percent of indicators of a lower level of attainment and unsatisfactory performance of a maximum of twenty-five (25) percent of indicators of a higher level of attainment.

The process of this invention for creating ability scales is iterative at three levels. First, in creating a scale, the process is iterative in repeatedly eliminating data on items and individuals with unacceptable fit and recalculating levels and fits based on the remaining items and individuals until a satisfactory scale is defined, as in the process loop depicted as FIG. 2c, blocks 219, 220 and 218. Secondly, if it is decided that data on additional items and individuals are required in the process of scale creation as depicted in block 221, then additional items are selected or created (as depicted in block 215) and/or additional individuals are identified (as depicted in block 216)and all the data including from previously determined acceptable items and individuals is reprocessed around the loop depicted as FIG. 2c, blocks 221, 215, 216, 217, 218, 219 and 220. Further, in subsequent tryouts and usage of a scale, through the expert system capabilities of the invention method (FIG. 2f), fit statistics are recalculated and analyzed based on larger populations and on longitudinal data from individuals' performance and the criteria for defining levels on scales are adjusted to achieve better and better indices of fit and predictive validity for each scale. The processing of calculating and evaluating fit statistics are well known to psychometricians and statisticians familiar with latent trait statistical techniques, which are facilitated by many of the commercially available statistical programs among which the MICROSCALE program cited here is one example. All such commercial statistical programs provide instructions for iteratively arriving at a scale with acceptable fit attributes.

Referring to FIG. 2d, there is a flow chart further illustrating the process of block 103 in FIG. 1, expanded to utilize the present invention algorithm for specifying capability requirements for any role and situation in terms of underlying abilities, rather than the disparate bases commonly used, and expanded to also function as part of the present invention system.. The first step in the process of FIG. 2d to evaluate individual capabilities as a match to the requirements of one or more specific role situations is to determine, as depicted by block 224, if information is already available, in a data file such as depicted in FIG. 2b block 214, on the level of the individual's attainment of all of the abilities required in the role situation against which the individual is to be evaluated. If such information is not available, the process continues as depicted in FIG. 2b block 208, If and when the information on the individual's attainment levels is available, the differences are calculated, as depicted in FIG. 2d block 225, between the individual's attained level, in each dimension of required abilities, and the levels required for both minimally successful and superior performance in the role situation, resulting in a series of positive or negative numbers, each representing the difference between attained and required of a required ability (positive representing an attainment greater than the requirement). The series of differences may be displayed and/or printed for evaluation, as depicted in block 226, as a profile of numbers in a tabular or block diagram form at or in whatever format facilitates the user's understanding and application. If the decision is then made, as depicted in block 227, to proceed with identification of optimum role-situation matches for the individual, then the process proceeds as depicted in FIG. 2e, block 228; if not the process of evaluating the individual's capabilities is then terminated or repeated as a match with the requirements for another specific role situation.

Figure 2E:
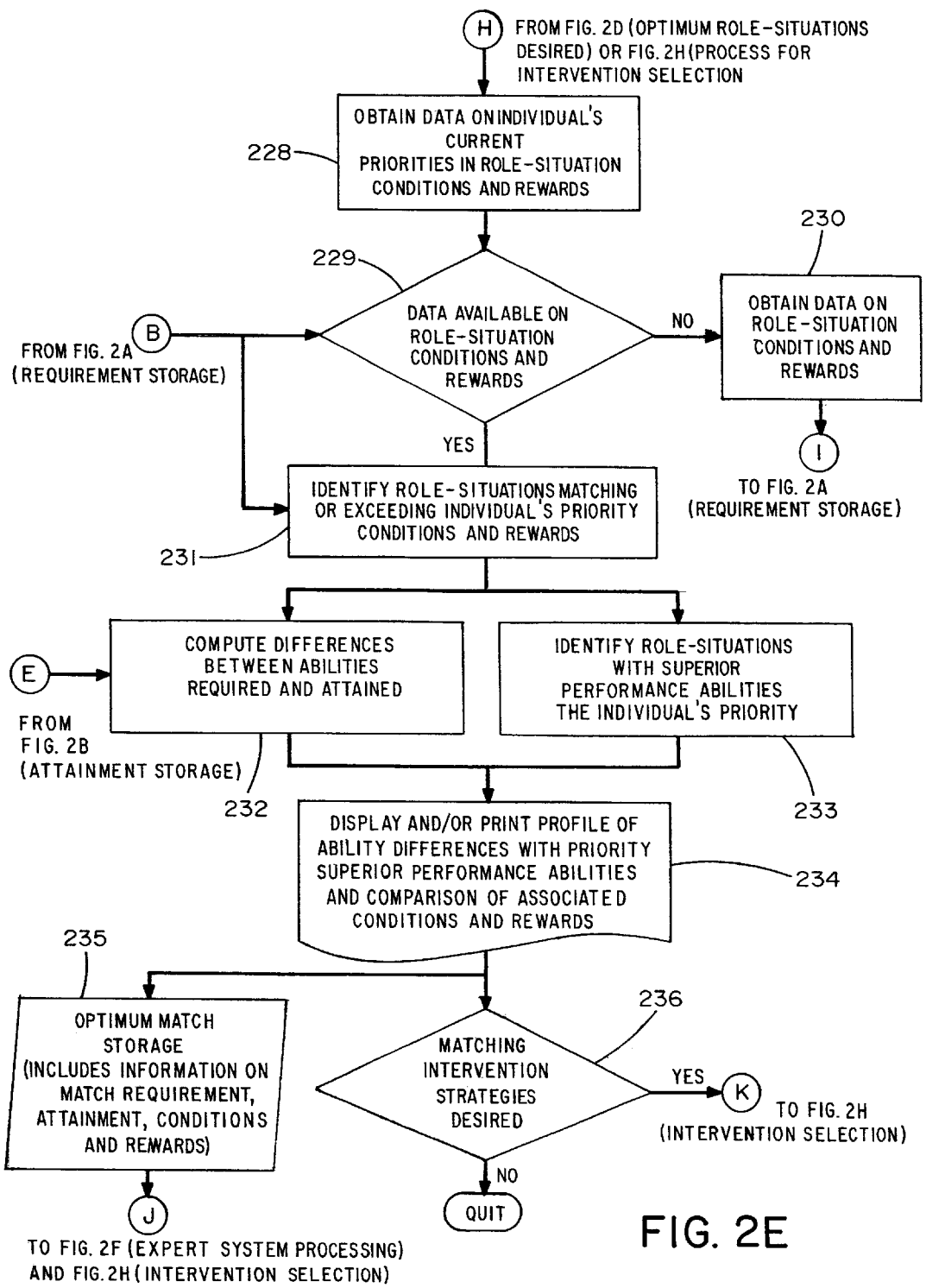
FIG. 2e is a flow chart of the process of the invention for identifying role-situations optimally matching an individual's abilities attainment and priorities in role situation conditions and rewards.

Referring to FIG. 2e, the preferred method applying this invention to identifying optimum matches for an individual, from among any number of role situations having defined ability requirements in a file of requirement storage as depicted in FIG. 2b block 212, is initiated by obtaining data on the individuals current priorities in role situation conditions and rewards as depicted in block 228. This information maybe appropriately obtained through a variety of means which would be apparent to anyone familiar with the art, most often through an interview or questionnaire, the latter readily administered through paper forms or computers. It is important to obtain data on the individual's priorities in role situation conditions and rewards concurrent with each attempt to identify optimum matches, as priorities in conditions and rewards can change within minutes due to unforeseeable outside factors, such as a sudden illness, a financial gain or loss or a political or other environmental change. It is next determined, as depicted in block 229, whether current data is available, in the file with requirement information (FIG. 2a block 205), on the individual's priority conditions and rewards associated with possible matches. If not, information is obtained, as depicted in block 230, on such conditions and rewards associated with possible role situations in the data file (block 229). Whenever such information is available, the role situations are identified, as depicted in block 231, which offer conditions and rewards meeting or exceeding the individual's priority conditions and rewards. For those role situations identified in the process depicted as block 231, the differences are calculated as depicted in block 232 between the individual's attained level, in each dimension of required abilities, and the levels required for both minimally successful and superior performance in the role situation (same as the process depicted in FIG. 2d block 225) and role situations are identified in the process depicted as block 233 which require abilities for superior performance that the individual identified as either using or further developing as a priority condition in the process depicted as block 228. The outcomes of the processes depicted as blocks 232 and 233 are then displayed and/or printed for evaluation, as depicted in block 234, as a profile of numbers in a tabular or block diagram form at or in whatever format facilitates the user's understanding and application. The information inputs and outcomes of the processes depicted as blocks 232 and 233 are also stored in a data file as depicted in block 235. If it is decided as depicted in block 236 that it is desired to continue the process to identify intervention strategies that can effect improvement in a level of the individual's attainment of required abilities, then the process is continued as depicted in FIG. 2h; if not, the process is then terminated.

The method of this invention for identifying optimum role-situation matches, as above described and depicted in FIG. 2e, has unique advantages in identifying roles and situations for individuals which have ability requirements for successful performance within the attained capabilities of the individual in all domains. Moreover, by providing opportunities for experiences requiring abilities that the individual has expressed interest in further developing and that have been identified as contributing to superior performance, the probability of a successful match has been increased. Furthermore, the prognosis for a continued successful match has been enhanced as the individual is being matched with a situation in which he or she has a good chance of embarking on a path of continued just right challenge, on which path the individual is continuously challenged above the level of boredom and below the level evoking disabling stress, as illustrated in FIG. 5.

Figure 2F:
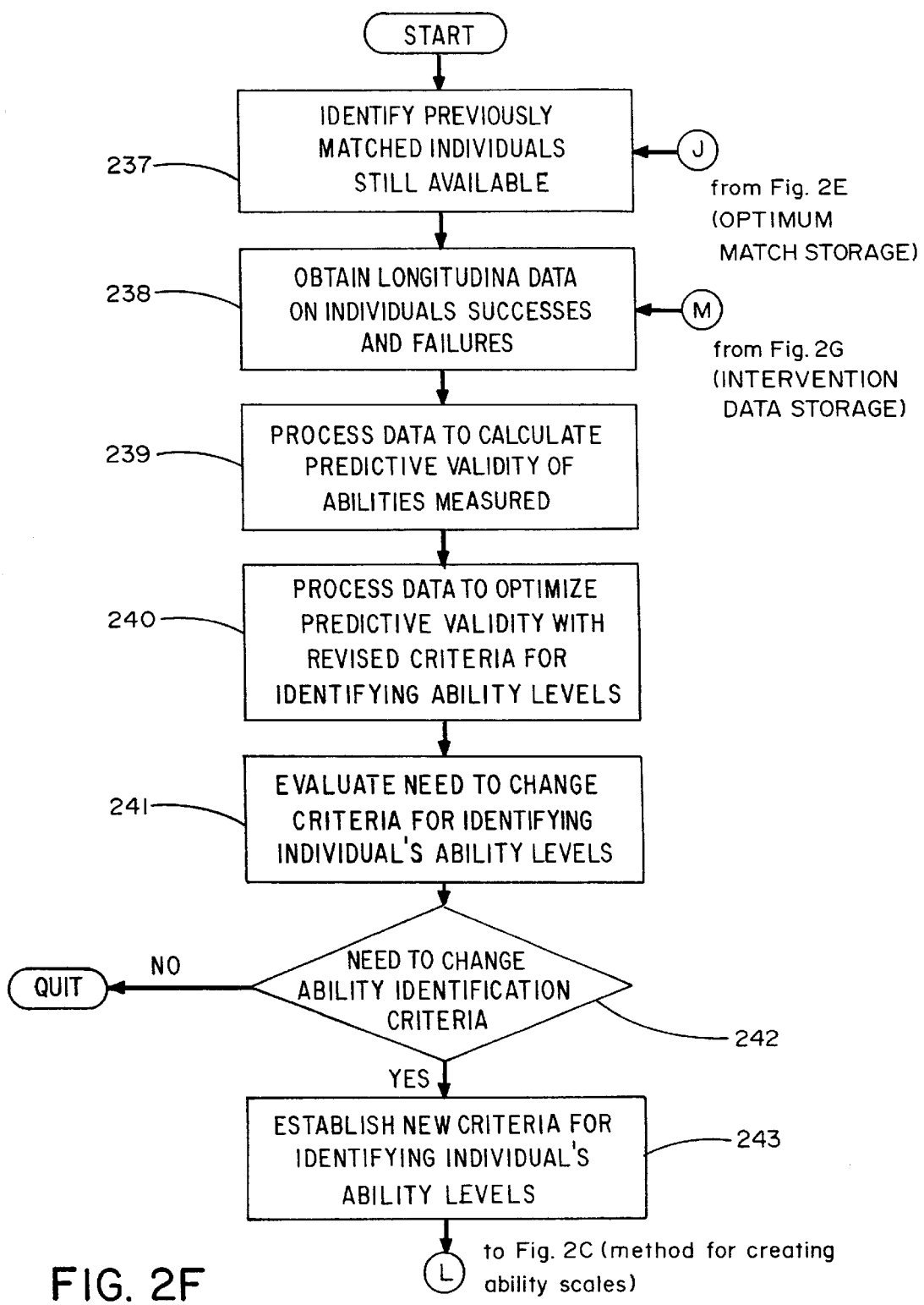
FIG. 2f is a flow chart of the process of the invention for improving the predictive validity of ability measures through revision of the criteria for identifying individual's ability levels.

Referring to FIG. 2f, the methods of this invention are periodically made more effective in operation by improving the predictive validity of ability measures through analysis of longitudinal data and increasing amounts of other data. The process is initiated by identifying individuals, as depicted in block 237, previously matched with role situations through the process of this invention as depicted in FIG. 2e, who are still available. For these individuals, longitudinal data is then obtained to the extent available, through the process depicted as block 238, on the success and failure of each individual in all role situations undertaken since the last matching process as recorded in data storage depicted as FIG. 2e block 235. The process of obtaining data as depicted in block 238 includes carrying out the process illustrated in FIG. 2g for all role situations undertaken, including any which may have been previously matched through the methods of this invention and any interventions targeted to improve abilities, treating all role situations as interventions with targeted and untargeted abilities improvements as the case may be.

Figure 2G:
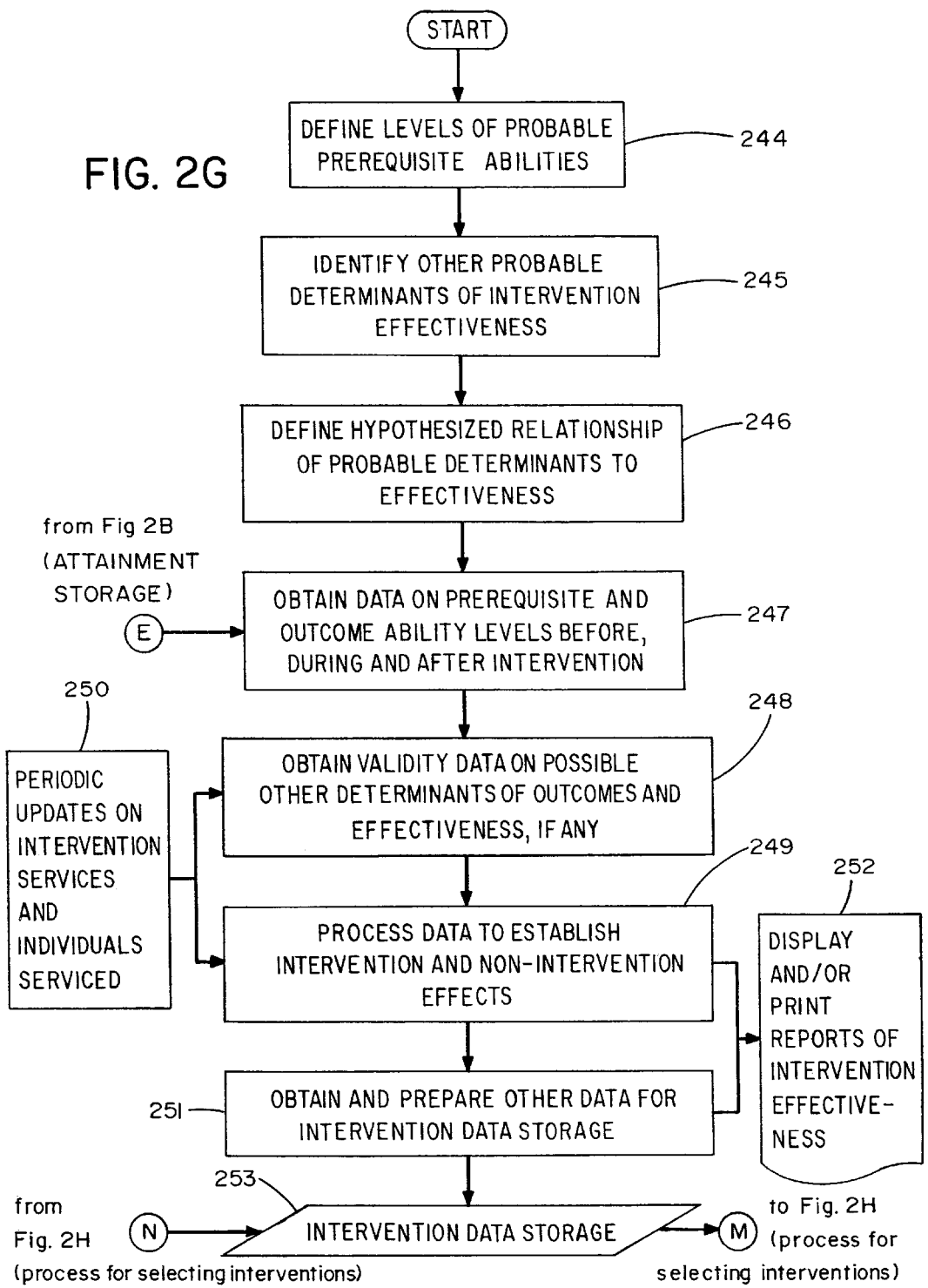
FIG. 2g is a flow chart of the process of the invention for producing data on interventions' prerequisites and effectiveness in furthering individuals' attainment of targeted abilities.
Figure 2H:
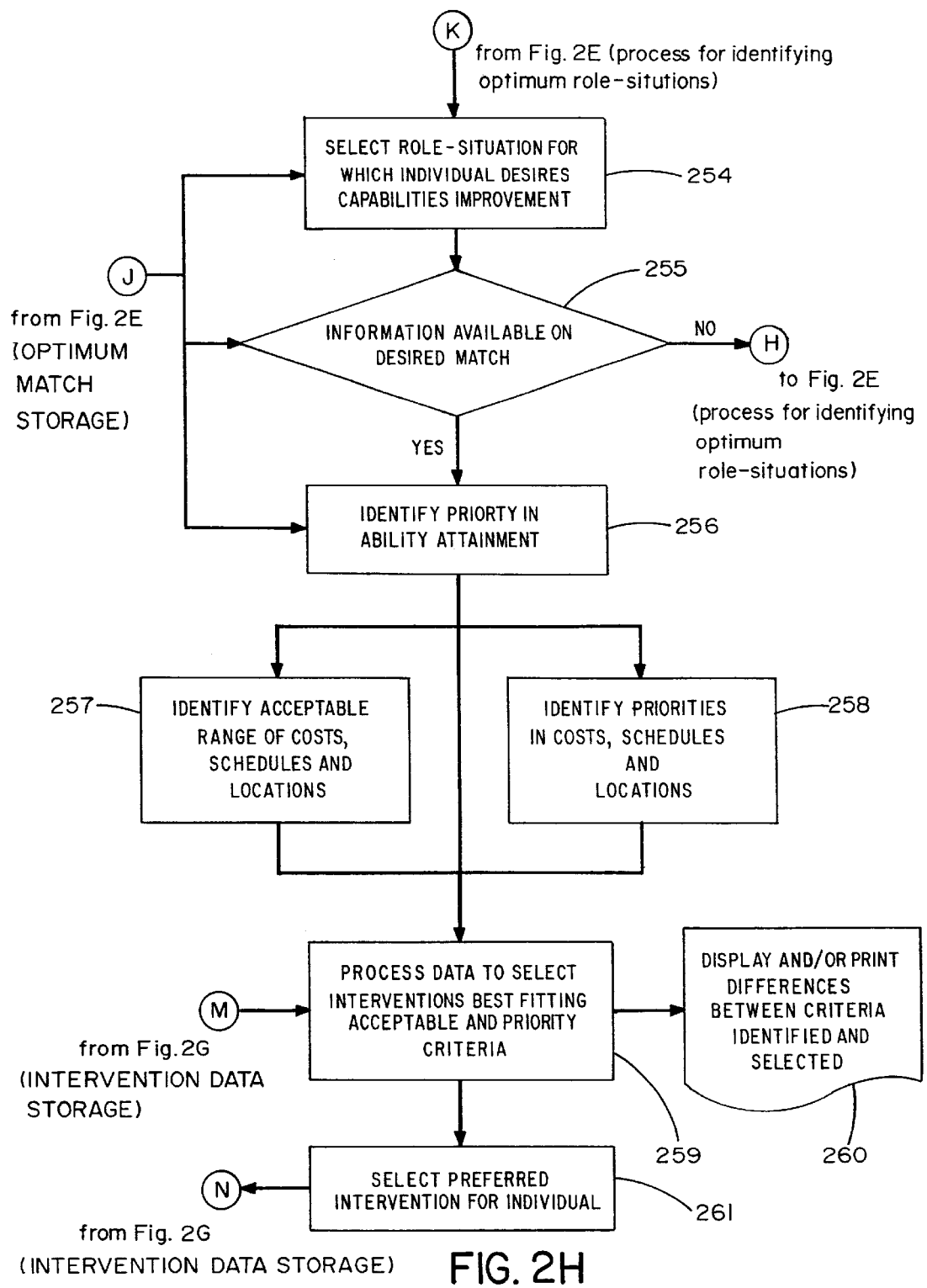
FIG. 2h is a flow chart of the process of the invention for selecting interventions to improve individual's capabilities for selected role-situations with consideration of intervention costs, schedules and locations.

Processing of the data obtained in the above as depicted in block 238, through the processes depicted as FIG. 2f blocks 239 and 240, utilizes any and all of the various well known statistical techniques for establishing, analyzing and perfecting predictive validity. Appropriate methodology to analyze and optimize predictive validity would be apparent to anyone skilled in the psychometric and statistical art. The outcomes of the process depicted as block 240 to optimize predictive validity is then evaluated, in the process depicted as block 241, to make a judgement on whether and what changes in criteria should be implemented to increase the overall effectiveness of the methods of this invention. If a decision as depicted in block 242 is made to not make any changes then the process for improving predictive validity of ability measures is temporarily completed. If the decision as depicted in block 242 is made to change ability identification criteria, then the method for creating ability scales as depicted in FIG. 2c and stored in FIG. 2c block 223 is appropriately changed through the establishment of new criteria for identifying specific ability levels of individuals as depicted in block 243. Referring to FIG. 2g there is a flow chart illustrating the preferred process of this invention for producing information on interventions, including role situations which have tasks and targeted outcomes other than directly related to the improvement of the incumbent's abilities. In producing information on such experiences, in which effects on an individual's abilities are initially untargeted and unknown, as in most experiences in life other than in schools and training programs, hypothesized targets and target effects are temporarily introduced as here described. This process is initiated by defining, as depicted in block 244, a hypothesized or presumed profile.of abilities prerequisite to an individual attaining targeted or hypothesized higher level abilities through the intervention or experience, in accordance with the methods of this invention and the process depicted in FIG. 2a as described above. Although through this invention most status factors influencing success are translated to developable and measurable abilities, e.g., the effect of marital status on success in a role requiring extended travel with this invention is considered as a willingness-to-undertake-extended-travel dimension of Type II affective abilities, it is further recognized in the methods of this invention that there may be determinants of intervention effectiveness which may not yet be developable or measureable at the present state-of-the art, e.g., the effect of a supportive home environment on young children or the aged. Such other probable or possible determinants are identified in the process depicted as block 245 and their hypothesized relationship to the attainment of targeted or hypothesized higher level abilities are defined in the process depicted as block 246. Data is obtained, in the process depicted as block 247, on the individual's attained levels of both prerequisite abilities and targeted (or hypothesized) abilities before during and after the intervention/experience from the data file depicted as block 214 on FIG. 2b and/or through psychometric techniques appropriate to the particular behavioral indicators as would be apparent to anyone familiar with the psychometric art and described above for obtaining such data for the process depicted as block 211 on FIG. 2b. Analysis of the data in accordance with hypothesized and empirically indicated relationships is carried out, in the process depicted as block 249, in accordance with the various basic and experimental statistical techniques apparent as applicable to those familiar with the statistical art. Additional data required for specific analytic techniques is obtained through the process depicted as block 248 and periodic updates on the nature and extent of the intervention/ experience as it may effect an individual is provided through the process depicted as block 250. The results of the analysis depicted as block 249 along with such other data that might contribute to its comprehension and application, e.g., intervention costs, schedules, locations, are prepared, as depicted in block 251, for display and/or printing, as depicted in block 252, and for storage in a data file as depicted in block 253. Referring to FIG. 2*h* there is a flow chart illustrating the preferred process of this invention for selecting interventions targeted to increase an individual's level of abilities required for a particular role situation. In initiating the process an individual selects, as depicted in block 254, the particular role situation for which he or she desires to improve capability, utilizing information from the process of identifying optimum role situation matches, as depicted in FIG. 2*e*, and, in particular, from the data file in which matching information is stored as depicted in FIG. 2*e*, block 235. If it is determined, as depicted in block 255, by the individual or his/her counselor, that appropriate (i.e., current, complete, desired etc.)information is not available then this process proceeds to obtain such information through the process depicted in FIG. 2*e*. If and when appropriate information is so determined (block 255) to be available, then the process is continued by the individual identifying, through the process depicted as block 256, his/her current priority in undertaking attainment of higher abilities, through any of the widely known techniques for eliciting such priorities, including interviews, paper questionairres and/or computer administered questionnaires. Through such similar techniques, the individual for whom the intervention is being selected, also identifies an acceptable range of costs for the intervention, through the process depicted as block 257, and his/her priorities between costs, schedules and locations of the intervention, through the process depicted as block 258. Data on the individual's preferences, as elicited through the processes depicted as blocks 254, 256, 257 and 258, together with the data on available interventions stored in the data file depicted on FIG. 2*g* block 253, processed to select interventions best fitting the individual's preferences, in the process depicted as block 259. The various interventions selected through the process of block 259, are then appropriately displayed, as depicted in block 260, to facilitate comprehension and decision-making as will be apparent to anyone familiar with this art. Utilizing the information displayed or printed as depicted in block 260, the individual or his/her counselor then makes a selection of the preferred intervention, as depicted in block 261, and the information used in selecting best fitting interventions (block 259) and information on the preferred selection (block 261) are then filed in intervention data storage, identified as FIG. 2*g* block 253, thus completing the preferred process of this invention for selecting interventions for specific individuals as depicted in FIG. 2*h*.

It is anticipated that the processes described as depicted in FIGS. 2*g* and 2*h* may be applied to any intervention targeted to affect behavioral capabilities including instruction, self-study, formal or on-job training, practice, therapy, and medical treatments.

Figure 6A:
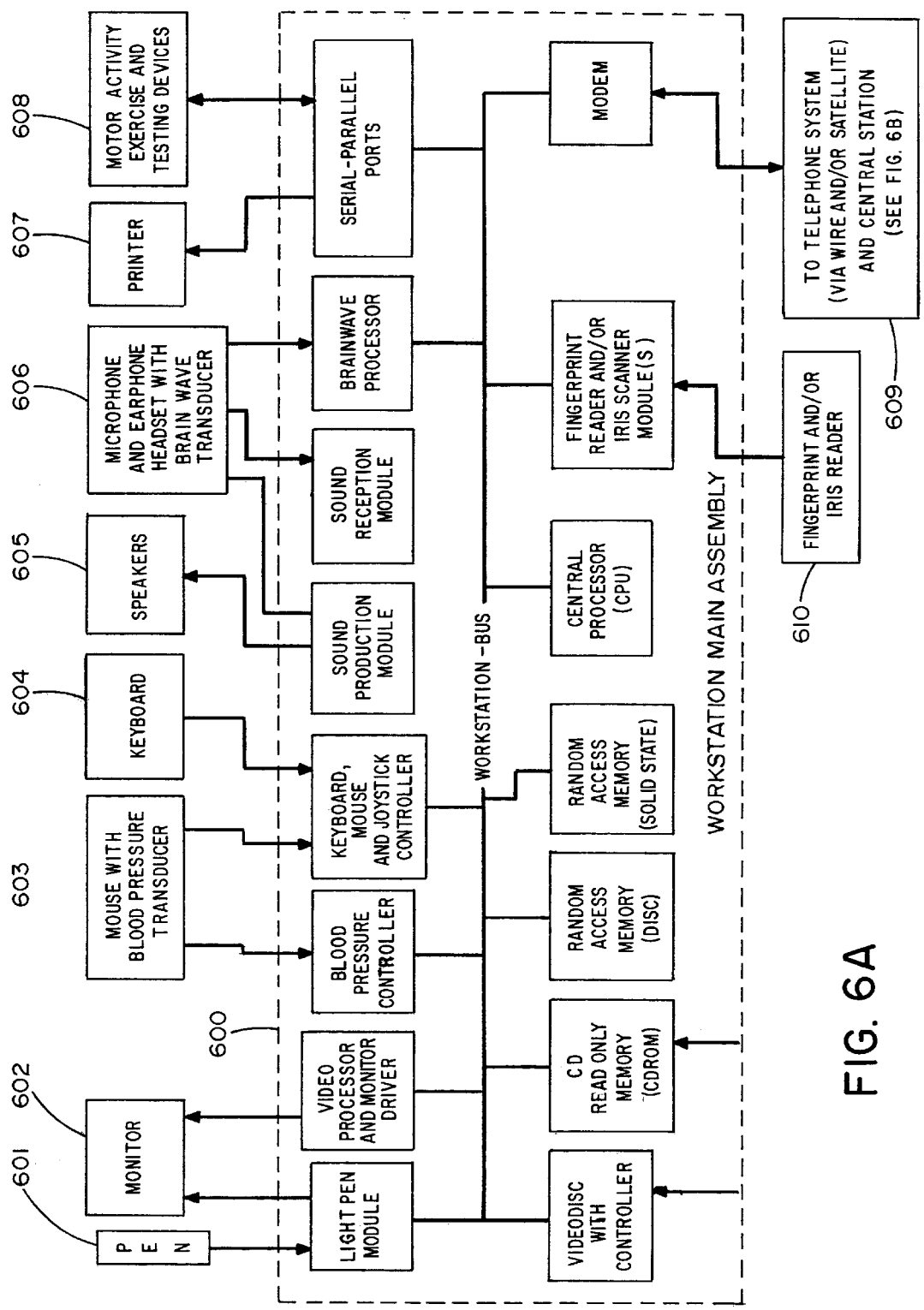
FIG. 6a is a block diagram of a remote user workstation in a system for matching individuals with the behavioral requirements of particular roles in situations.

Technological advances in computers, and computer related equipment and software, provide the basis for incorporating the various methods of this invention in advantageous systems. FIG. 6*a* is a block diagram of a typical remote user workstation in a system consisting of one or more central stations linked to one or more user workstations. A central station consists of a commercially available mainframe computer with processing and memory capacity appropriate to the number of workstations and amount of stored data. More than one central station at different locations with shared stored data is advisable to increase overall system reliability and optimize transmission costs. The data files and software libraries in central station memory are listed in FIG. 6*b*. The preferred processes for this invention as described in the above and depicted on FIGS. 2*a* through 2*h* and 3*a* through 3*g* may be performed off a hardware system, as described, but are also the preferred processes of this invention for system operations. FIG. 6*c* identifies the symbols used in the illustrations of FIGS. 2 and 3 for system operation.

Figure 7:
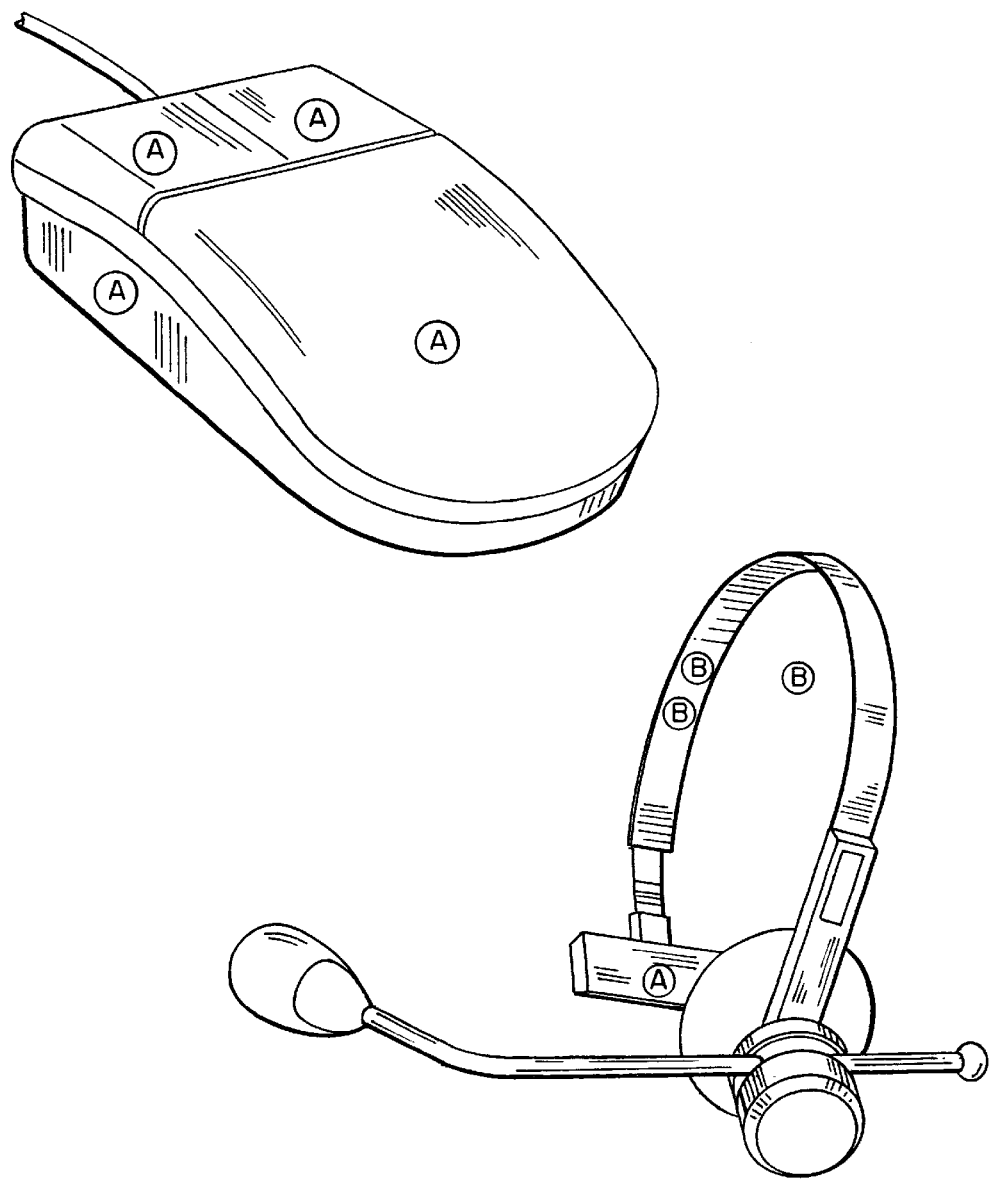
FIG. 7 is an illustration of apparatuses for unobtrusively obtaining data on an individual's tension levels and brain waves associated with specific workstation or computer operations.

Referring to FIG. 6*a*, the depicted user work station is a distributed computer data system composed of commercially-available equipment which can be used by the present invention with the two apparatuses of this invention depicted in FIG. 7. The main assembly 600 is commercially available as an alternative configuration of a standard personal computer enhanced with commercially available plug-in boards to drive and/or input-from the peripheral equipment identified as blocks 601 to 610. The light pen 601, the mouse-transducer of this invention 603, the keyboard 604 and the microphone part of the microphone-earphone-transducer assembly of this invention 606 may be alternatively used for user or operator inputs depending on particular software designer preference. The monitor 602, speakers 605, earphone part of the microphone-earphone-transducer assembly of this invention 606 and the printer 607 may be alternatively used for outputs to the user or operator, also depending on particular software designer preference. The motor activity devices 608, are commercially available equipment with special computer inputs provided by their manufacturers. The modem connection 609 provides the data input to and from any of the alternative commercially available communication links for transmissions to and from the central station of this system. The commercially available fingerprint and/or iris scanning devices 610 provide secure data on user identity. (For example, a suitable fingerprint device is available from Veridicom Inc. in Menlo Park, Calif. (415) 926-7769; a suitable iris scanning device is available from IriScan Inc. in Mount Laurel, N.J. (800) 333-6777.)

An important feature of this invention is the incorporation of foolproof, secure, high reliability means for assuring identification of users. Without such means the systems of this invention would not be useful as confidential information on individuals would be available to unauthorized users and the data files on individuals could be inputted with fictitious data or data representing the attainment of wrong persons.

Referring to FIG. 6*b*, there is a list identifying the data files and on-line software libraries in the central station of the preferred embodiment of the system of this invention. All of the data files and programs for the preferred process of this invention described above and illustrated in FIGS. 2*a* through 2*h* and 3*a* through 3*g* are stored in the system's central station memory as identified in FIG. 6*b*, items 651 through 656. All software for the various operating modes of this invention system not otherwise specifically identified, are stored as identified as item 657. All statistical procedures for the various analyses and calculations of the preferred processes of this invention, including procedures for periodic validity checking and improvement, are stored as identified as item 658. Background and administrative information on user operation, including records of specific times and activities of each user's usage, are stored as identified as item 659. System security protocols, including commercially provided algorithms for the secure data associated with the commercially provided fingerprint and iris scanning devices, are stored as identified as item 660. Financial and administrative programs, including files of the records they generate, are commercially available and stored as identified as item 661.

FIG. 7 is an illustration of a commercially available mouse adapted to measure user's tension related skin resistance and a a commercially available headset adapted with transducers to pick-up skin resistance and targeted brain waves, each comprising an apparatus of this invention to improve the identification of individual' abilities attainment. Data on brain waves and skin resistance associated with specific user responses contribute to the measurement of tension required to identify Type III stress management abilities inaccordance with FIG. 5. Data on user tension associated with the performance of indicators of particular abilities attainment are used in the methods of this invention to further differentiate indicators of required abilities in situations with tension inducing environments, i.e., situations with very large or small rates of change in sensory inputs. Articles in professional literature confirm that data on brain waves also contribute to measurement of Type II affective abilities, Type V aesthetic abilities, Type VI ethical abilities and Type VII spiritual abilities. Their usefulness in each of the suggested measurements will be further enhanced through the expert-system capabilities of the invention and, thereby, appropriately further incorporated in system operations. Suitable transducers and software for skin resistance and brainwaves are commercially available (e.g., from Ivy Biomedics Inc. In Branford Conn. (203)481-4183 and from BrainTracers in England (31-475) 488709) and may be alternatively located in any or all of the locations identified in FIG. 5 to optimize response pickups in accordance with presentation instructions.

The present invention has been described in considerable detail in order to comply with the patent laws by providing full public disclosure of at least one of its forms. However, such detailed description is not intended in any way to limit the broad features or principles of the present invention.

Now that the preferred embodiments of the invention have been shown and described, various modifications and improvements thereon will become readily apparent to those skilled in the art. As various changes may be made in the form, construction and arrangement of the procedures and parts described herein, without departing from the spirit and scope of the invention and without sacrificing any of its advantages, all matter herein is to be interpreted as illustrative and not in any limiting sense but is to be defined by the appended claims, in which is claimed:

What is claimed is:

1. A computerized process for evaluating an individual's behavioral capabilities for a particular role and situation, comprising:
   specifying one or more tasks, each with associated one or more outcomes, required for the individual to meet criteria of desired performance in the particular role and situation;
   specifying one or more techniques that may be used to accomplish the required one or more tasks so as to attain all the associated one or more outcomes;
   specifying a set of one or more abilities necessary and sufficient to carry out the one or more techniques and to accomplish the one or more required tasks;
   obtaining the individual's attainment of ability or abilities;
   comparing the set of one or more necessary and sufficient abilities with the attained ability or abilities of the individual; and
   evaluating appropriateness of matching the individual and the particular role and situation together by the comparing;
   wherein the specified set of one or more necessary and sufficient abilities comprises cognitive ability, affective ability, physiological ability, strategic ability, aesthetic ability, ethical ability, spiritual ability, or any combination thereof; and wherein:
   the spiritual ability has as prerequisites the cognitive ability, the affective ability, the physiological ability, the strategic ability, the aesthetic ability, and the ethical ability;
   the ethical ability has as prerequisites the cognitive ability, the affective ability, the physiological ability, the strategic ability and the aesthetic ability;
   the aesthetic ability has as prerequisites the cognitive ability, the affective ability, the physiological ability and the strategic ability;
   the strategic ability has as prerequisites the cognitive ability, the affective ability and the physiological ability;
   the physiological ability has as prerequisites the cognitive ability and the affective ability; and
   the affective ability has as a prerequisite the cognitive ability.

2. A computerized process for evaluating an individual's behavioral capabilities for a particular role and situation, comprising:
   specifying one or more tasks, each with associated one or more outcomes, required for the individual to meet criteria of desired performance in the particular role and situation;
   specifying one or more techniques that may be used to accomplish the required one or more tasks so as to attain all the associated one or more outcomes;
   specifying a set of one or more abilities necessary and sufficient to carry out the one or more techniques and to accomplish the one or more required tasks;
   obtaining the individual's attainment of ability or abilities;
   comparing the set of one or more necessary and sufficient abilities with the attained ability or abilities of the individual; and
   evaluating appropriateness of matching the individual and the particular role and situation together by the comparing;
   wherein the specifying the set of one or more necessary and sufficient abilities includes determining whether a cognitive ability should be added to the set of one or more necessary and sufficient abilities; and wherein the determining whether a cognitive ability should be added includes defining the cognitive ability by:
   identifying both thinking-skills component and knowledge component of the cognitive ability;
   identifying a level of the thinking-skills component, on a scale calibrated by behavioral indicators with invariant parameters, that is sufficient to carry out the one or more techniques and accomplish the one or more required tasks;
   identifying a level of the knowledge component, on a scale calibrated by behavioral indicators with invariant parameters, that is sufficient to carry out the one or more techniques and accomplish the one or more required tasks; and
   identifying a level of the cognitive ability as both the levels of the thinking-skills component and of the knowledge component, on the respective scales calibrated by behavioral indicators with invariant parameters, that is sufficient to carry out the one or more techniques and accomplish the one or more required tasks.

3. The process of claim 1, wherein each of the cognitive ability, the affective ability, the physiological ability, the strategic ability, the aesthetic ability, the ethical ability, and the spiritual ability includes one or more different dimensions.

4. The process of claim 1, wherein the specifying the set of one or more necessary and sufficient abilities includes determining whether an affective ability should be added to the set of one or more necessary and sufficient abilities; and wherein the affective ability includes motivation as a dimension of the affective ability.

5. The process of claim 4 further comprising:
identifying any ability from the one or more necessary and sufficient abilities that will also contribute to a superior role performance at a higher level than the sufficient level needed for the identified ability.

6. The process of claim 4, wherein the specifying the set of one or more necessary and sufficient abilities further includes:
determining whether a spiritual ability should be added to the set of one or more necessary and sufficient abilities.

7. The process of claim 4, wherein the specifying the set of one or more necessary and sufficient abilities further includes:
determining whether an ethical ability should be added to the set of one or more necessary and sufficient abilities.

8. The process of claim 4, wherein the specifying the set of one or more necessary and sufficient abilities further includes:
determining whether an aesthetic ability should be added to the set of one or more necessary and sufficient abilities.

9. The process of claim 4, wherein the specifying the set of one or more necessary and sufficient abilities further includes:
determining whether a strategic ability should be added to the set of one or more necessary and sufficient abilities.

10. The method of claim 4, wherein the obtaining the individual's attainment of ability or abilities comprises entering data relating to the individual's attainment of ability or abilities into a computer system with an electronic mouse, a keyboard, a joystick, an electronic pen, a sound transducer, a brain-wave transducer, or a motor-activity sensing device, or any combination thereof.

11. The method of claim 4, wherein the obtaining the individual's attainment of ability or abilities comprises receiving data relating to the individual's attainment of ability or abilities into a computer system via transducers embedded into surfaces of a computer mouse, joystick, tracking ball, or earphone.

12. The method of claim 4, wherein the obtaining the individual's attainment of ability or abilities comprises receiving data relating to the individual's attainment of ability or abilities into a computer system via tactile transducers embedded into a surface of an electronic device.

13. The process of claim 1, wherein the specifying the set of one or more necessary and sufficient abilities includes determining whether a physiological ability should be added to the set of one or more necessary and sufficient abilities; and wherein the physiological ability includes stress management as a dimension of the physiological ability.

14. The process of claim 13, wherein the comparing the set of one or more necessary and sufficient abilities with the attained ability or abilities of the individual includes:
determining a difference between the individual's attained ability or abilities and the set of one or more necessary and sufficient abilities.

15. The process of claim 13, wherein the determining the difference includes:
assigning a profile of zero difference when the individual's attained ability or abilities and the set of one or more necessary and sufficient abilities are equal;
assigning a profile of positive difference when the individual's attained ability or abilities is/are greater than the set of one or more necessary and sufficient abilities;
assigning a profile of negative difference when the individual's attained ability or abilities is/are less than the set of one or more necessary and sufficient abilities.

16. The method of claim 13, wherein the obtaining the individual's attainment of ability or abilities comprises entering data relating to the individual's attainment of ability or abilities into a computer system with an electronic mouse, a keyboard, a joystick, an electronic pen, a sound transducer, a brain-wave transducer, or a motor-activity sensing device, or any combination thereof.

17. The method of claim 13, wherein the obtaining the individual's attainment of ability or abilities comprises receiving data relating to the individual's attainment of ability or abilities into a computer system via transducers embedded into surfaces of a computer mouse, joystick, tracking ball, or earphone.

18. The method of claim 13, wherein the obtaining the individual's attainment of ability or abilities comprises receiving data relating to the individual's attainment of ability or abilities into a computer system via tactile transducers embedded into a surface of an electronic device.

19. The process of claim 3, wherein the comparing the set of one or more necessary and sufficient abilities with the attained ability or abilities of the individual includes:
determining a difference between the individual's attained ability or abilities and the set of one or more necessary and sufficient abilities.

20. The process of claim 3, wherein the determining the difference includes:
assigning a profile of zero difference when the individual's attained ability or abilities and the set of one or more necessary and sufficient abilities are equal;
assigning a profile of positive difference when the individual's attained ability or abilities is/are greater than the set of one or more necessary and sufficient abilities;
assigning a profile of negative difference when the individual's attained ability or abilities is/are less than the set of one or more necessary and sufficient abilities.

21. The process of claim 3, further comprising:
identifying any ability from the one or more necessary and sufficient abilities that will also contribute to a superior role performance at a higher level than the sufficient level needed for the identified ability.

22. The method of claim 3, wherein the obtaining the individual's attainment of ability or abilities comprises entering data relating to the individual's attainment of ability or abilities into a computer system with an electronic mouse, a keyboard, a joystick, an electronic pen, a sound transducer, a brain-wave transducer, or a motor-activity sensing device, or any combination thereof.

23. The method of claim 3, wherein the obtaining the individual's attainment of ability or abilities comprises receiving data relating to the individual's attainment of ability or abilities into a computer system via transducers embedded into surfaces of a computer mouse, joystick, tracking ball, or earphone.

24. The method of claim 3, wherein the obtaining the individual's attainment of ability or abilities comprises receiving data relating to the individual's attainment of ability or abilities into a computer system via tactile transducers embedded into a surface of an electronic device.

* * * * *